United States Patent
Tanimoto

(10) Patent No.: US 9,380,130 B2
(45) Date of Patent: *Jun. 28, 2016

(54) RELAY COMMUNICATION SYSTEM AND RELAY SERVERS

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 427 days.

This patent is subject to a terminal disclaimer.

(21) Appl. No.: 13/994,185

(22) PCT Filed: Oct. 17, 2011

(86) PCT No.: PCT/JP2011/073873
§ 371 (c)(1),
(2), (4) Date: Jun. 14, 2013

(87) PCT Pub. No.: WO2012/081303
PCT Pub. Date: Jun. 21, 2012

(65) Prior Publication Data
US 2013/0275501 A1    Oct. 17, 2013

(30) Foreign Application Priority Data
Dec. 16, 2010  (JP) .................. 2010-280035

(51) Int. Cl.
*G06F 15/16* (2006.01)
*H04L 29/06* (2006.01)
(Continued)

(52) U.S. Cl.
CPC ............ *H04L 67/42* (2013.01); *H04L 12/4641* (2013.01); *H04L 12/6418* (2013.01)

(58) Field of Classification Search
CPC ............ H04L 61/3085; H04L 12/4625; H04L 29/1265; H04L 12/4641; H04L 29/12754; H04L 61/303; H04L 45/64; H04L 65/105; H04L 67/42; H04L 12/6418; B65H 19/1815; B65H 19/1873

USPC .................................................. 709/203–246
See application file for complete search history.

(56) References Cited

U.S. PATENT DOCUMENTS 8,356,116 B2 * 1/2013 Tanimoto ............ H04L 61/3085
709/249
2001/0005267 A1 * 6/2001 Tanimoto ...................... 358/1.9
(Continued)

FOREIGN PATENT DOCUMENTS

| JP | 2008-129991 A | 6/2008 |
| JP | 2010-068051 A | 3/2010 |
| JP | 2010-268312 A | 11/2010 |

OTHER PUBLICATIONS

English translation of Official Communication issued in corresponding International Application PCT/JP2011/073873, mailed on Jun. 27, 2013.

(Continued)

*Primary Examiner* — David Lazaro
*Assistant Examiner* — Berhanu Shitayewoldetsadi
(74) *Attorney, Agent, or Firm* — Keating & Bennett, LLP

(57) ABSTRACT

A virtual network is dynamically created when a relay communication system is constructed including a plurality of relay servers that are arranged to communicate with each other. In the relay communication system, the VLAN client terminals defining the VLAN group are allowed to share VLAN group information. In addition, a VLAN session is established between the activatable VLAN devices among the VLAN client terminals based on the VLAN group information, and the VLAN devices are allowed to share virtual address information created when the VLAN group is activated. The VLAN device sets the given virtual address in a VLAN interface of the VLAN device, and communicates with other VLAN device using the virtual address and VLAN session.

10 Claims, 16 Drawing Sheets

(51) Int. Cl.
*H04L 12/46* (2006.01)
*H04L 12/64* (2006.01)

(56) References Cited

U.S. PATENT DOCUMENTS

| | | | |
|---|---|---|---|
| 2004/0114194 A1* | 6/2004 | Eguchi et al. | 358/400 |
| 2004/0148432 A1* | 7/2004 | Udono et al. | 709/238 |
| 2004/0151204 A1* | 8/2004 | Eguchi et al. | 370/465 |
| 2004/0246531 A1* | 12/2004 | Eguchi et al. | 358/400 |
| 2005/0162706 A1* | 7/2005 | Eguchi et al. | 358/442 |
| 2005/0168774 A1* | 8/2005 | Eguchi et al. | 358/1.15 |
| 2006/0112271 A1* | 5/2006 | Soumiya et al. | 713/168 |
| 2006/0179317 A1* | 8/2006 | Soumiya et al. | 713/176 |
| 2008/0288591 A1 | 11/2008 | Tanimoto | |
| 2011/0161525 A1* | 6/2011 | Tanimoto | 709/249 |
| 2011/0179167 A1* | 7/2011 | Tanimoto | 709/225 |
| 2012/0057602 A1 | 3/2012 | Tanimoto | |
| 2013/0246505 A1* | 9/2013 | Tanimoto | 709/203 |
| 2013/0275501 A1* | 10/2013 | Tanimoto | 709/203 |

OTHER PUBLICATIONS

Official Communication issued in International Patent Application No. PCT/JP2011/073873, mailed on Dec. 13, 2011.

* cited by examiner

FIG. 6

| relayserverA | clientA1 |
| --- | --- |
| | clientA2 |
| relayserverB | clientB1 |
| | clientB2 |
| relayserverC | clientC1 |

```
<?xml version="1.0" encoding="UFT-8" ?>
- <root>
    - <site id="serverA@trial.net" name="serverA" stat="active">                           }  301-1
        <node div="dev" group="1279671471393.clientA1.rd.002@serverA.trial.net"
            id="clientA1.rd.002@serverA.trial.net" name="clientA1"
            site="serverA@trial.net" />                                                       302-1
        <node div="dev" group="1279671471393.clientA1.rd.002@serverA.trial.net"
            id="clientA2.rd.002@serverA.trial.net" name="clientA2"
            site="serverA@trial.net" />
      </site>
    - <site id="serverB@trial.net" name="serverB" stat="active">                           }  301-2
        <node div="dev" group="1279671471393.clientA1.rd.002@serverA.trial.net"
            id="clientB1.rd.002@serverB.trial.net" name="clientB1"
            site="serverB@trial.net" />                                                       302-2
        <node div="dev" group="1279671471393.clientA1.rd.002@serverA.trial.net"
            id="clientB2.rd.002@serverB.trial.net" name="clientB2"
            site="serverB@trial.net" />
      </site>
    - <site id="serverC@trial.net" name="serverC" stat="active">                           }  301-3
        <node div="dev" group="1279671471393.clientA1.rd.002@serverA.trial.net"
            id="clientC1.rd.002@serverC.trial.net" name="clientC1"                            302-3
            site="serverC@trial.net" />
      </site>
  </root>
```

FIG. 8

```
<?xml version="1.0" encoding="UFT-8" ?>
- <root>
    <node addr="192.168.2.1" div="dev" expr="1213935978484"
      group="1279671471393.clientA1.rd.002@serverA.trial.net"
      id="clientA2.rd.002@serverA.trial.net" name="clientA2" pass="abc"
      port="50700" />
    <node addr="192.168.1.30" div="dev" expr="1213935978484"
      group="1279671471393.clientA1.rd.002@serverA.trial.net"
      id="clientA1.rd.002@serverA.trial.net" name="clientA1" pass="def" port="0" />
  </root>
```

```
<?xml version="1.0" encoding="UFT-8" ?>
- <root>
    <node addr="192.100.1.3" div="dev" expr="1213935978484"
      group="1279671471393.clientA1.rd.002@serverA.trial.net"
      id="clientB1.rd.002@serverB.trial.net" name="clientB1" pass="abc"
      port="50700" />
    <node addr="192.100.1.2" div="dev" expr="1213935978484"
      group="1279671471393.clientA1.rd.002@serverA.trial.net"
      id="clientB2.rd.002@serverB.trial.net" name="clientB2" pass="noui"
      port="50700" />
  </root>
```

```
<?xml version="1.0" encoding="UFT-8" ?>
- <root>
    <node addr="200.1.2.1" div="dev" expr="1213935978484"
      group="1279671471393.clientA1.rd.002@serverA.trial.net"
      id="clientC1.rd.002@serverC.trial.net" name="clientC1" pass="abc"
      port="50700" />
  </root>
```

60

```
<?xml version="1.0" encoding="UFT-8" ?>
<root>
<vnet auto="0" group="1279671471393.clientA1.rd.002@trial.net"
 id="1279672104671.clientA1.rd.002@trial.net" lastmod="1279672104671"
 name="vlangroup1">
<dev id="clientA1.rd.002@serverA.trial.net" />
<dev id="clientB1.rd.002@serverB.trial.net" />
<dev id="clientB2.rd.002@serverB.trial.net" />
<dev id="clientC1.rd.002@serverC.trial.net" />
<ssn sp="serverA.trial.net" ep="serverB@trial.net" />
<ssn sp="serverA.trial.net" ep="serverC@trial.net" />
<ssn sp="serverB.trial.net" ep="serverC@trial.net" />
</vnet>
</root>
```

FIG. 11

| ID | virtual IP address | virtual MAC address |
|---|---|---|
| clientA1.rd.002@trial.net | 117.112.0.1 | 00.11.22.f0.00.01 |
| clientB1.rd.002@trial.net | 117.112.0.2 | 00.11.22.f0.00.02 |
| clientB2.rd.002@trial.net | 117.112.0.3 | 00.11.22.f0.00.03 |
| clientC1.rd.002@trial.net | 117.112.0.4 | 00.11.22.f0.00.04 |

```
<?xml version="1.0" encoding="UFT-8" ?>
- <root>
  - <site id="serverA@trial.net" name="serverA" stat="active">    }  311-1
      <node div="dev" group="1279671471393.clientA1.rd.002@serverA.trial.net"
        id="clientA1.rd.002@serverA.trial.net" name="clientA1"
        site="serverA@trial.net" />
      <node div="dev" group="1279671471393.clientA1.rd.002@serverA.trial.net"
        id="clientA2.rd.002@serverA.trial.net" name="clientA2"
        site="serverA@trial.net" />
    </site>
  </root>
```
31-1, 312-1

FIG. 15

```
<?xml version="1.0" encoding="UFT-8" ?>
- <root>
  - <site id="serverB@trial.net" name="serverB" stat="active">    }  311-2
      <node div="dev" group="1279671471393.clientA1.rd.002@serverA.trial.net"
        id="clientB1.rd.002@serverB.trial.net" name="clientB1"
        site="serverB@trial.net" />
      <node div="dev" group="1279671471393.clientA1.rd.002@serverA.trial.net"
        id="clientB2.rd.002@serverB.trial.net" name="clientB2"
        site="serverB@trial.net" />
    </site>
  </root>
```
31-2, 312-2

FIG. 16

```
<?xml version="1.0" encoding="UFT-8" ?>
- <root>
  - <site id="serverC@trial.net" name="serverC" stat="active">    }  311-3
      <node div="dev" group="1279671471393.clientA1.rd.002@serverA.trial.net"
        id="clientC1.rd.002@serverC.trial.net" name="clientC1"
        site="serverC@trial.net" />
  </site>
  </root>
```
31-3, 312-3

RELAY COMMUNICATION SYSTEM AND RELAY SERVERS

BACKGROUND OF THE INVENTION

1. Field of the Invention

The present invention relates to a relay communication system including a plurality of relay servers that can communicate with each other, a plurality of client terminals, and LANs connecting the client terminal to the relay server, and also relates to a relay server used in the relay communication system.

2. Description of the Related Art

In some systems, client terminals connected to remote local area networks (LANs) communicate with each other through a wide area network (WAN). A virtual private network (VPN) makes it possible to configure a virtual network in which the remote local area networks (LANs) are connected directly with each other. However, in the virtual private network (VPN), it is difficult to configure a network that is expandable and flexible.

A relay communication system shown in Japanese Laid-open Patent Publication No. 2008-129991 can configure a virtual network in which the remote local area networks (LANs) are directly connected with each other, as in the virtual private network (VPN). Moreover, in the relay communication system, it is easy to configure a network with expandability and flexibility, unlike the virtual private network (VPN).

In the relay communication system shown in Japanese Laid-open Patent Publication No. 2008-129991, the number and the connection states of LANs and client terminals may be changed. However, in Japanese Laid-open Patent Publication No. 2008-129991, no specific means is disclosed that confirms changes to the number of client terminals and connection states of client terminals in real time when the relay server designates a destination for communication. In Japanese Laid-open Patent Publication No. 2008-129991, no specific means is disclosed to dynamically configure a virtual network between a client terminal and a relay server.

SUMMARY OF THE INVENTION

Preferred embodiments of the present invention dynamically create a virtual network when configuring a relay communication system that includes a plurality of relay servers able to communicate with each other.

Hereinafter, a plurality of preferred embodiments of the present invention which correct problems in the prior art are disclosed. The preferred embodiments and various features thereof can be combined with each other as necessary.

According to one preferred embodiment of the present invention, a relay communication system includes a first network, a second network, a first relay server, a second relay server, and client terminals. The first relay server is connected to the first network. The second relay server is connected to the second network, and is configured to communicate with the first relay server via a third network. One of the client terminals is connected to the first relay server via the first network. Another one of the client terminals is connected to the second relay server via the second network.

Each of the first relay server, the second relay server, the client terminal connected to the first relay server, and the client terminal connected to the second relay server includes: a relay group information storage unit, a relay server information storage unit, an information sharing unit, and a VLAN group information control unit. The relay group information storage unit is configured to store relay group information that indicates the first relay server, the second relay server, and the client terminal connected to the first relay server, and the client terminal connected to the second relay server define a relay group. The relay server information storage unit is configured to store relay server information that includes activation information of the first relay server, activation information of the second relay server, activation/registration information of the client terminal connected to the first relay server, and activation/registration information of the client terminal connected to the second relay server. The information sharing unit is configured to allow the first relay server, the second relay server, the client terminal connected to the first relay server, and the client terminal connected to the second relay server, to share the relay group information and the relay server information. The VLAN group information control unit is configured to allow VLAN client terminals defining a VLAN group in the relay group to share VLAN group information. At least two client terminals among the client terminal connected to the first relay server and the client terminal connected to the second relay server are the VLAN client terminals. The VLAN group information includes hub information including identification information of the first relay server and identification information of the second relay server, to which the VLAN client terminal is connected, session information that indicates a connecting-side and a connected-side of a session established between the first relay server and the second relay server, and identification information that identifies the VLAN client terminal.

Each of the first relay server and the second relay server further includes an activation command control unit, and a VLAN session control unit. The activation command control unit is programmed and configured to transmit a response signal including address information of a VLAN device as a VLAN client terminal that can be activated in a case of receiving an activation instruction of the VLAN group. The VLAN session control unit is programmed and configured to establish a hub session as a VLAN session between the first relay server and the second relay server based on the session information, and establish a device session as a VLAN session between the first relay server or the second relay server and the VLAN device connected to the first relay server or the second relay server.

Each of the client terminal connected to the first relay server and the client terminal connected to the second relay server further includes a virtual address control unit programmed and configured to create virtual address information that includes virtual addresses given to the VLAN device based on the response signal, and transmit the virtual address information to the VLAN device. If the client terminal connected to the first relay server or the client terminal connected to the second relay server is a VLAN device, the client terminal is configured to set the given virtual address in a VLAN interface of the client terminal, and communicate with other VLAN device using the virtual address information and the VLAN session.

In this case, if the client terminal connected to the first relay server or the client terminal connected to the second relay server is a VLAN device, the given virtual address is set in the VLAN interface of the client terminal, and the client terminal communicates with other VLAN devices using the virtual address information and the VLAN session.

In this case, a process is performed of sharing the VLAN group information in the VLAN group, and a process is performed to establish the VLAN session between the VLAN devices, and sharing the virtual address information that is created when the VLAN group is activated. Furthermore, the VLAN device sets the given virtual address in the VLAN interface of the client terminal. As a result, the client terminals can communicate with each other as VLAN devices using the virtual address information and the VLAN session.

Preferably, each of the first relay server and the second relay server further includes a relay server communication control unit. The relay server communication unit is configured to control communication between the VLAN devices. The relay server communication control unit, in a case of receiving a communication packet, is programmed and configured to analyze the received communication packet to confirm whether or not the communication packet includes the virtual address. If the analyzed communication packet includes the virtual address, the relay server communication control unit is programmed and configured to refer to the virtual address and transmit the communication packet via the hub session to the first relay server or the second relay server, which is connected to the VLAN device to which the virtual address is given, or refer to the virtual address and transmits the communication packet via the device session to the VLAN device to which the virtual address is given.

Preferably, each of the first relay server, the second relay server, the client terminal connected to the first relay server, and the client terminal connected to the second relay server further includes a VLAN group information update unit. The VLAN group information update unit is configured to update the VLAN group information in accordance with change to a connection state of the VLAN client terminal.

Preferably, the relay communication system further includes a third relay server. The third relay server is configured to communicate with the first relay server and the second relay server via a third network, and define the relay group. Each of the relay group information and the relay server information further includes information of the third relay server. In a case that the VLAN group information update unit receives an activation instruction of the VLAN group, if the VLAN client terminal is connected to the third relay server, rather than the first relay server or the second relay server indicated in the hub information, the VLAN group information update unit is configured to update the VLAN group information by adding identification information of the third relay server to the hub information of the VLAN group and by creating a session information including the third relay server.

The virtual address preferably includes a virtual IP address and a virtual MAC address given to the VLAN device.

According to another preferred embodiment of the present invention, a relay server is configured to communicate with a first relay server connected to a first network and server as a second relay server connected to a second network. The relay server includes a relay group information storage unit, a relay server information storage unit, an information sharing unit, a VLAN group information control unit, an activation command control unit, a virtual address control unit, a VLAN session control unit, and a relay server communication control unit. The relay group information storage unit is configured to store relay group information that indicates that the first relay server, the second relay server, a client terminal connected to the first relay server, and a client terminal connected to the second relay server define a relay group. The relay server information storage unit is configured to store relay server information including an activation information of the first relay server, activation information of the second relay server, activation/registration information of the client terminal connected to the first relay server, and activation/registration information of the client terminal connected to the second relay server. The information sharing unit is configured to allow the first relay server, the second relay server, the client terminal connected to the first relay server, and the client terminal connected to the second relay server, to share the relay group information and the relay server information. The VLAN group information control unit is programmed and configured to share VLAN group information among the VLAN client terminals defining a VLAN group in the relay group. At least two client terminals among the client terminals connected to the first relay server and the second relay server are the VLAN client terminals. The VLAN group information includes hub information including identification information of the first relay server and the second relay server to which the VLAN client terminal is connected, session information that indicates a connecting-side and a connected-side in a session established between the first relay server and the second relay server, and identification information that identifies the VLAN client terminal. The activation command control unit is programmed and configured to transmit, a response signal including address information of a VLAN device that can be activated as a VLAN client terminal in a case of receiving an activation instruction of the VLAN group. The virtual address control unit is programmed and configured to transmit virtual address information to the VLAN device, in a case of receiving the virtual address information including virtual addresses which is given to the VLAN devices and is created based on the response signal. The VLAN session control unit is programmed and configured to establish a hub session as a VLAN session with the first relay server based on the session information, and establish a device session as a VLAN session with the VLAN device connected to the second relay server. The relay server communication control unit is programmed and configured to control communication among the VLAN devices using the virtual address and the VLAN session.

In a case of receiving a communication packet, the relay server communication control unit preferably analyzes the received communication packet to confirm whether or not the communication packet includes virtual address information. If the communication packet includes the virtual address information, preferably, the relay server communication control unit is programmed and configured to refer to the virtual address and transmit the communication packet via the hub session to the relay server connected to the VLAN device to which the virtual address is given, or refer to the virtual address and transmit the communication packet via the device session to the VLAN device to which the virtual address is given.

The relay server also includes a VLAN group information update unit. The VLAN group information update unit is configured to update the VLAN group information in accordance with a change of the connection state of the VLAN client terminal.

In the case that the VLAN client terminal is connected to a third relay sever defining the relay group, rather than the first relay server or the second relay server indicated by the hub information when the VLAN group information update unit receives an activation instruction of the VLAN group, the VLAN group information update unit is preferably configured to update the VLAN group information by adding identification information of the third relay sever to the hub information of the VLAN group and by creating a session information including the third relay server.

The virtual address preferably includes a virtual IP address and a virtual MAC address given to the VLAN device.

In a relay communication system according to various preferred embodiments of the present invention, when a relay communication system includes a plurality of relay servers that communicate with each other; the communication system is capable of dynamically creating the virtual network, and in which client terminals are capable of communicating with each other as VLAN devices using the virtual address and the VLAN session.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a view showing a schematic configuration of relay server information according to a preferred embodiment of the present invention.

FIG. 7 is a view showing a detailed configuration of relay server information according to a preferred embodiment of the present invention.

FIG. 8 is a view showing a schematic configuration of client terminal information stored in a first relay server according to a preferred embodiment of the present invention.

FIG. 9 is a view showing a schematic configuration of client terminal information stored in a second relay server according to a preferred embodiment of the present invention.

FIG. 10 is a view showing a schematic configuration of client terminal information stored in a third relay server according to a preferred embodiment of the present invention.

FIG. 11 is a view showing a detailed configuration of VLAN group information according to a preferred embodiment of the present invention.

FIG. 12 is a view showing a detailed configuration of virtual address information according to a preferred embodiment of the present invention.

FIG. 14 is a view showing the detailed configuration of relay server information before the exchange according to a preferred embodiment of the present invention.

FIG. 15 is a view showing the detailed configuration of the relay server information before the exchange according to a preferred embodiment of the present invention.

FIG. 16 is a view showing the detailed configuration of the relay server information before the exchange according to a preferred embodiment of the present invention.

DETAILED DESCRIPTION OF THE PREFERRED EMBODIMENTS

In a relay communication system of according to a preferred embodiment of the present invention, client terminals can communicate with each other through a wide area network (WAN), through a plurality of relay servers realizing a function similar to hubs.

Figure 1:
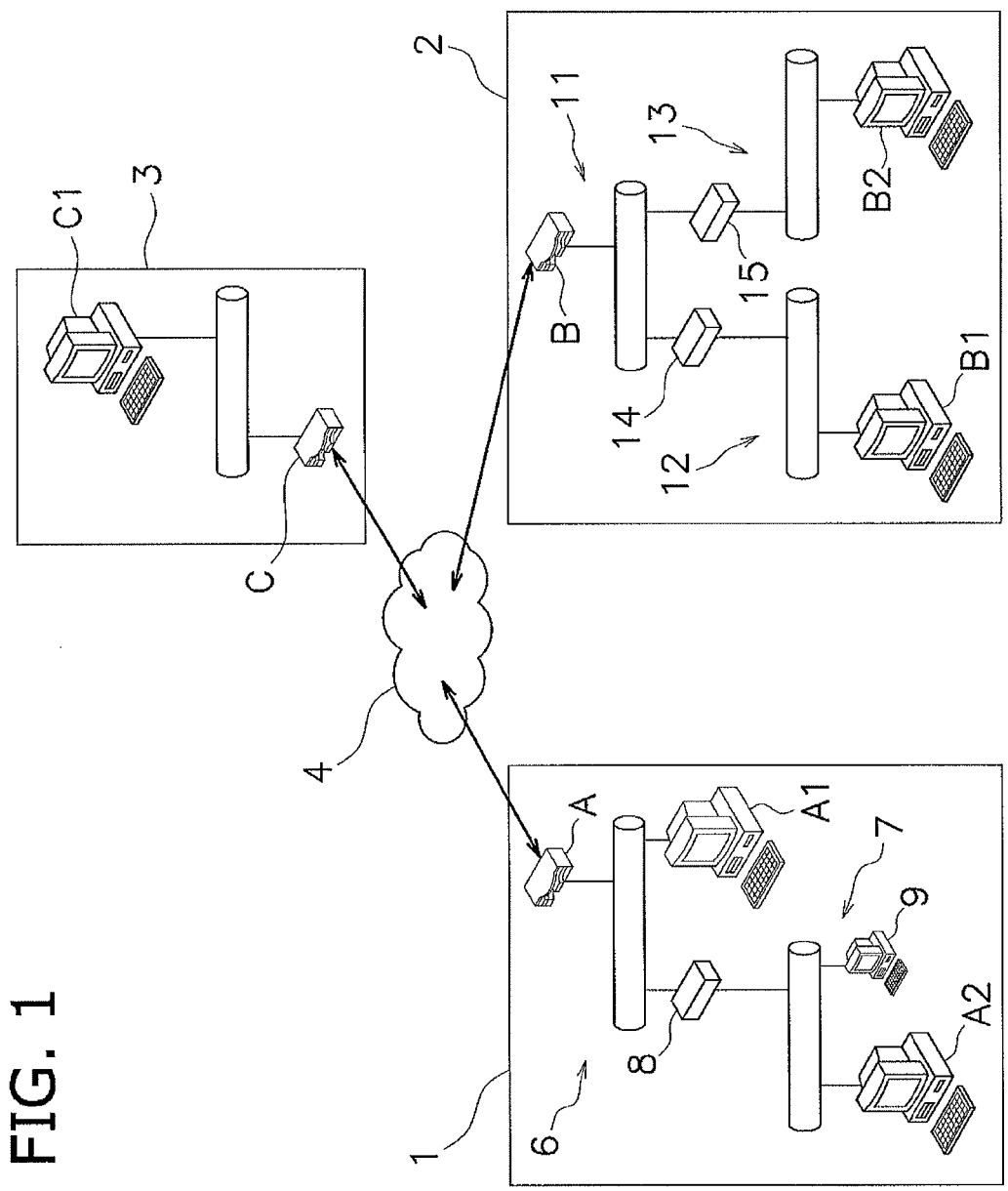
FIG. 1 is a schematic diagram the overall configuration of a relay communication system according to a preferred embodiment of the present invention.

Hereinafter, referring to the drawings, preferred embodiments of the present invention will be explained. FIG. 1 shows an overall structure of the relay communication system according to a preferred embodiment of the present invention. The relay communication system is preferably defined by a first LAN 1, a second LAN 2, a third LAN, a wide area network (WAN) 4, for example. The first LAN 1, the second LAN 2 and the third LAN 3 are a small-sized network remotely provided. The wide area network (WAN) 4 is a large-scale network such as the Internet.

In this preferred embodiment, explained in detail later, a first relay server A of the first LAN 1, a second relay server B of the second LAN 2, a third relay server C of the third LAN 3 define a first relay group as a relay server group.

The first LAN 1 preferably includes a fourth LAN 6 and a fifth LAN 7, and the fourth LAN 6 and the fifth LAN 7 are connected with each other via a first general purpose router 8. In the fourth LAN 6, a first relay server A and a first client terminal A1 are preferably connected with each other. In the fifth LAN 7, a second client terminal A2 and a second communication equipment 9 are preferably connected with each other.

The second LAN 2 preferably includes a sixth LAN 11, a seventh LAN 12, and an eighth LAN 13. The sixth LAN 11 and the seventh LAN 12 are connected with each other via a second general purpose router 14, and the sixth LAN 11 and the eighth LAN 13 are connected with each other through a third general purpose router 15. The second relay server B belongs to the sixth LAN 11. The third client terminal B1 is connected to the seventh LAN 12. A fourth client terminal B2 is connected to the eighth LAN 13.

The third relay server C and the fifth client terminal C1 are preferably connected with each other in the third LAN 3.

The first client terminal A1, the second client terminal A2, the third client terminal B1, the fourth client terminal B2, and the fifth client terminal C1 are preferably personal computers, for example. The second communication equipment 9 is also preferably a personal computer, for example.

The first relay server A, the second relay server B, and the third relay server C relays communication among the first client terminal A1, the second client terminal A2, the third client terminal B1, the fourth client terminal B2, and the fifth client terminal C1. A communication protocol among the first relay server A, the second relay server B, and the third relay server C is not particularly limited.

The relay server is connected to the wide area network (WAN) as well as the LAN, so that the relay sever can communicate with relay servers located in other LANs as well as with client terminals connected to the same LAN. Accordingly, each of the relay servers is given a global IP address as well as a private IP address.

Figure 2:
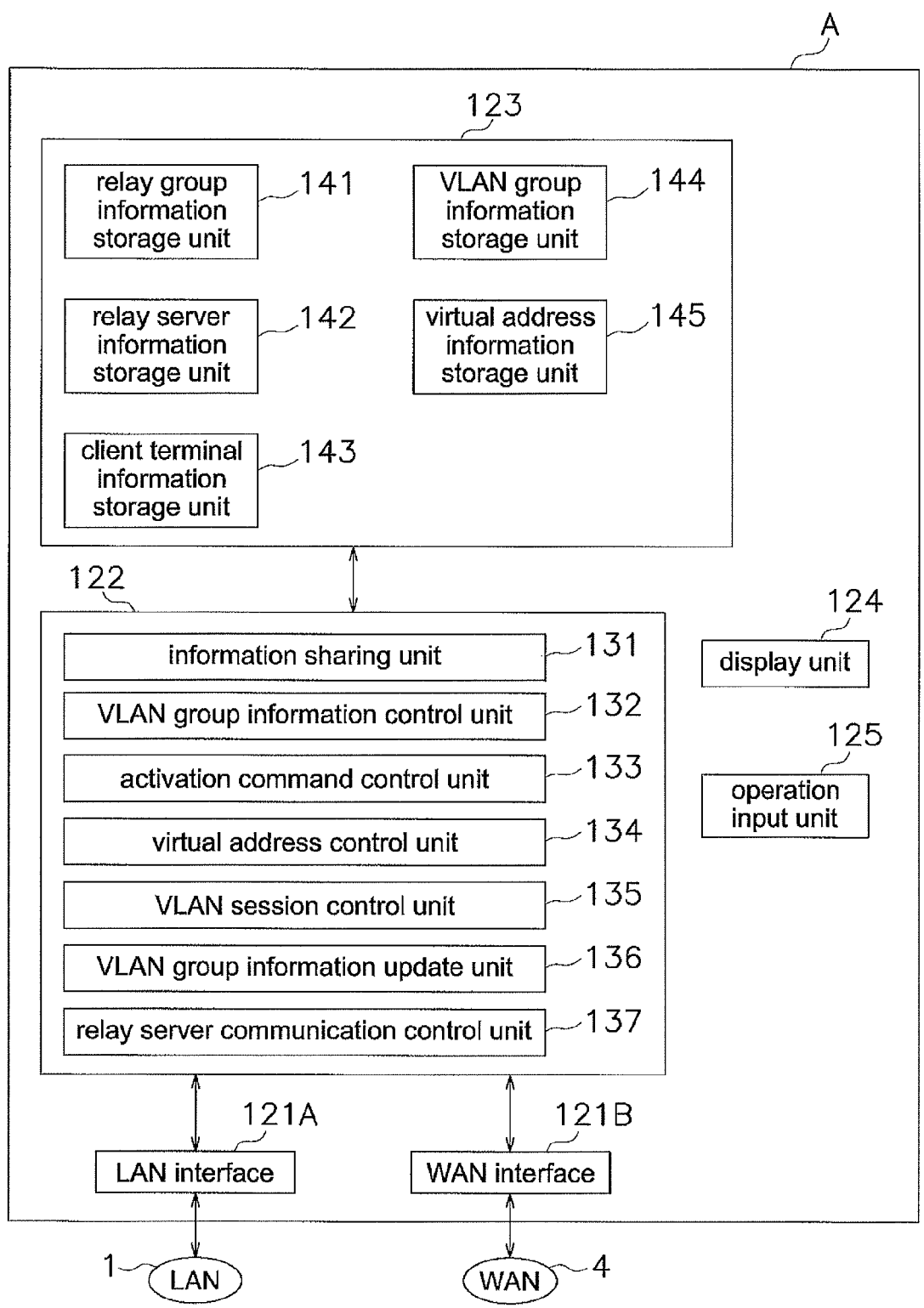
FIG. 2 is a block diagram showing a configuration of a first relay server according to a preferred embodiment of the present invention.

FIG. 2 shows constituent elements of the first relay server A according to a preferred embodiment of the present invention.

The first relay server A preferably includes a LAN interface 121A, a WAN interface 121B, a control unit 122, a database storage unit 123, a display unit 124, and an operation input unit 125.

The LAN interface 121A executes communication with a terminal in the first LAN 1 using the private IP address. The WAN interface 121B executes communication with the wide area network (WAN) 4 using the global IP address.

The control unit 122 is preferably a CPU having functions of the control and operation, for example, and can execute various processes according to loaded programs. The control unit 122 in this preferred embodiment preferably includes an information sharing unit 131, a VLAN group information control unit 132, an activation command control unit 133, a virtual address control unit 134, a VLAN session control unit 135, a VLAN group information update unit 136, and a relay server communication control unit 137.

The information sharing unit 131 creates and updates relay group information, relay server information, and client terminal information, which will be later described. Moreover, the information sharing unit 131 shares the created and updated relay group information with a relay server in the relay group and client terminals connected to the relay server, and stores it in a relay group information storage unit 141 (described later). The information sharing unit 131 shares the created and updated relay server information with a relay server in the relay group and client terminals connected to the relay server, and stores it in a relay server information storage unit 142 (described later). The information sharing unit 131 shares the created and updated client terminal information with relay servers and client terminals in the relay group, and stores it in a client terminal information storage unit 143 (described later).

The VLAN group information control unit 132 shares a VLAN group information (described later) with a VLAN client terminal in the relay group and a relay server connected to the VLAN client terminal, and stores it in a VLAN group information storage unit 144 (described later). The VLAN client terminal is a client terminal that constitutes a VLAN group in the relay group.

The activation command control unit 133 extracts a VLAN client terminal connected to the first relay server A from the VLAN group information when it receives activation information of the VLAN group from a client terminal that receives an activation instruction of the VLAN group from a user. The activation information includes an activation command, activation time, and the VLAN group information of the VLAN group. In addition, the activation command control unit 133 determines whether or not the extracted VLAN client terminal is activatable. The activatable "VLAN client terminal" refers to a client terminal that is currently logging in and is not currently joining other VLAN groups. Specifically, the activation command control unit 133 refers to the relay server information stored in the relay server information storage unit 142, and then determines whether or not the extracted VLAN client terminal is logging in. In addition, the activation command control unit 133 transmits an activation command (described later), and determines whether or not the extracted VLAN client terminal is activatable, which will be described later in detail. Hereinafter, a VLAN client terminal that is determined as activatable by the activation command control unit 133 will be referred to as a VLAN device.

If it is determined that the VLAN device exists, the activation command control unit 133 transmits a response signal including the IP address and the MAC address of the VLAN device to a client terminal as a transmission source of the activation information of the VLAN group. The detail of the VLAN group information will be described later.

When virtual address control unit 134 receives the virtual address information and an initialization command, it transmits the virtual address information and the initialization command to the VLAN device connected to the first relay server A. In addition, the virtual address control unit 134 stores the virtual address information in the virtual address information storage unit 145 (described later). The detail of the virtual address information will be described later. The initialization command is a command related to initialization of the VLAN interface 221B.

The VLAN session control unit 135 refers to the VLAN group information, and then establishes a hub session as a VLAN session with another relay server to which the VLAN device is connected. In addition, the VLAN session control unit 135 refers to the VLAN group information, and then establishes a device session as a VLAN session with VLAN devices connected to the first relay server A. The hub session is a session between the relay servers to which the VLAN device is connected. The device session is a session between the VLAN device and relay server to which the VLAN device is connected.

The VLAN group information update unit 136 allows the VLAN client terminals and the relay servers to which the VLAN client terminals are connected to share the updated VLAN group information, when the VLAN group information is changed.

The relay server communication control unit 137 is a processing unit that controls various communications through the LAN interface 121A and the WAN interface 121B, and controls various communication processes in accordance with a protocol such as, for example, TCP/IP, UDP, and SIP. The relay server communication control unit 137 preferably controls communication between the VLAN devices using the virtual address information and the VLAN session. Specifically, the relay server communication control unit 137 analyzes a communication packet received from the client terminal connected to the first relay server A through the LAN interface 121A. Then, if the communication packet includes the virtual address, the control unit 137 refers to the virtual address, and transmits the communication packet to the other relay server via the hub session. Moreover, when the relay server communication control unit 137 receives a communication packet from the other relay server via the WAN interface 121B, it analyzes the received communication packet. Then, if the communication packet includes the virtual address, the relay server communication control unit 137 transmits the communication packet to the VLAN interface (described later) of the client terminal to which the virtual address is given under the control of the first relay server A, via the device session. In the other hand, if the virtual address is not included, the relay server communication control unit 137 transmits the communication packet to the LAN interface (described later) of the client terminal under the control of the first relay server A.

The database storage unit 123 preferably is a hard disk drive or a non-volatile RAM, for example, and can store various data. The database storage unit 123 preferably includes a relay group information storage unit 141, a relay server information storage unit 142, a client terminal information storage unit 143, a VLAN group information storage unit 144, and virtual address information storage unit 145. The detail of the information to be stored in the relay group information storage unit 141, the relay server information storage unit 142, the client terminal information storage unit 143, the VLAN group information storage unit 144 and the virtual address information storage unit 145 will be described later.

It should be noted that constituent elements of the second relay server B and the third relay server C are preferably similar to those of the first relay server A, so the explanation thereof will be omitted.

The client terminal is preferably a terminal the user can directly operate. For example, the client terminal is preferably a personal computer used for day-to-day operations by the user. Each of the client terminals is given a private IP address uniquely managed in the same LAN.

Figure 3:
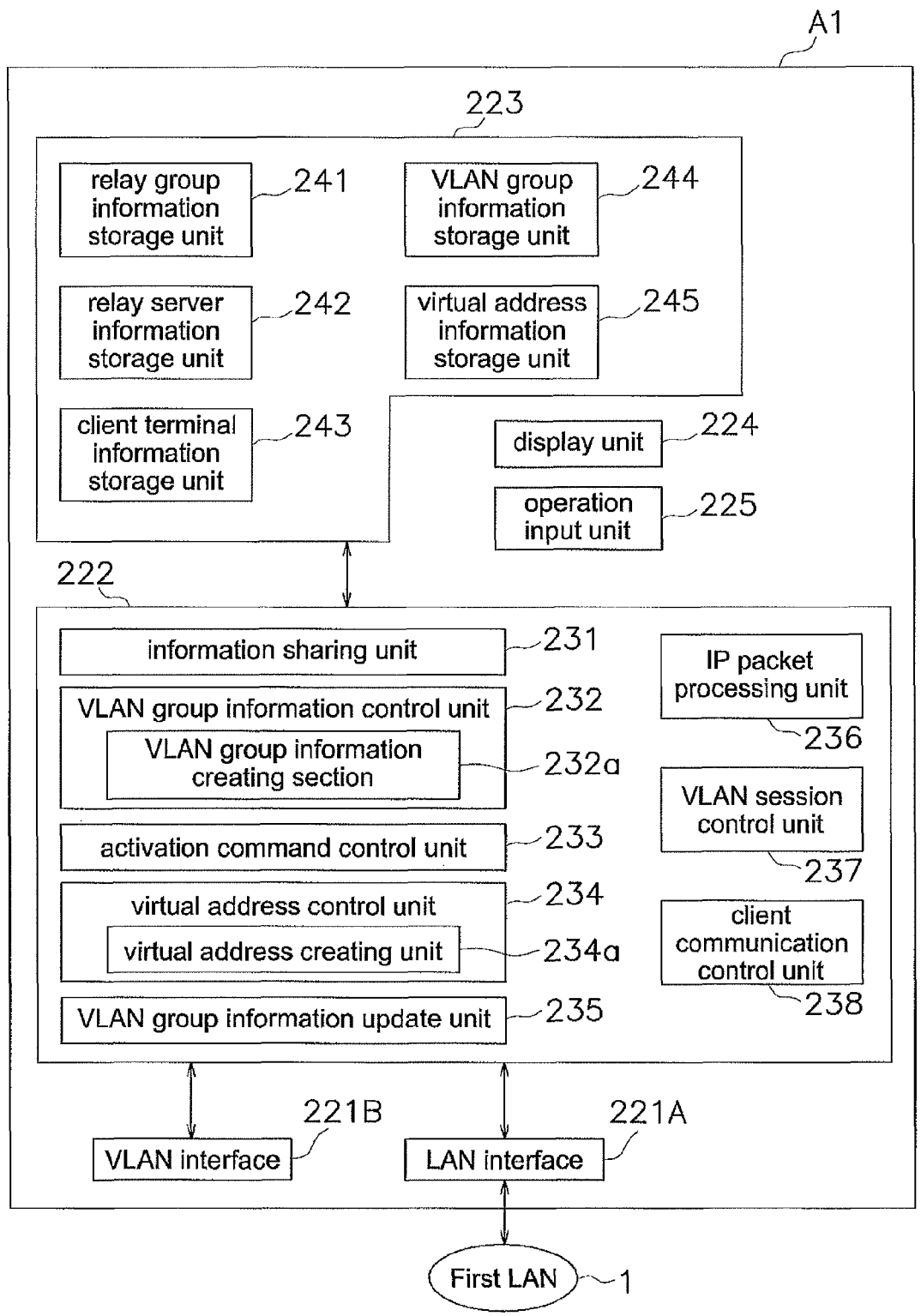
FIG. 3 is a block diagram showing a configuration of a first client terminal according to a preferred embodiment of the present invention.

FIG. 3 shows elements of the first client terminal A1. The first client terminal A1 preferably includes a LAN interface 221A, a VLAN interface 221B, a control unit 222, a database storage unit 223, a display unit 224, and an operation input unit 225.

The LAN interface 221A is arranged to execute communication with the first relay server A and other terminals in the first LAN 1 using the private IP address.

The VLAN interface 221B is arranged to execute communication with other terminal in the first relay group via the first relay server A using the virtual IP address (described later) and the device session.

The control unit 222 is a CPU that includes control and operation functions, and is arranged to execute various processes according to the loaded program. The control unit 222 in this preferred embodiment preferably includes an information sharing unit 231, a VLAN group information control unit 232, an activation command control unit 233, a virtual address control unit 234, a VLAN group information update unit 235, an IP packet processing unit 236, a VLAN session control unit 237, and a client communication control unit 238.

The information sharing unit 231 shares the relay group information with the relay server in the relay group and client terminals connected to the relay server, and stores them in the relay group information storage unit 241 (described later). In addition, the information sharing unit 231 shares the relay server information with the relay server in the relay group and client terminals connected to the relay server, and stores it in the relay server information storage unit 242 (described later). In addition, the information sharing unit 231 shares the client terminal information with the relay server and the client terminals in the relay group, and stores it in the client terminal information storage unit 243 (described later).

The VLAN group information control unit 232 shares the VLAN group information between the VLAN client terminal in the relay group and the relay server connected to the VLAN client terminal, and stores it in the VLAN group information storage unit 244 (described later). In addition, the VLAN group information control unit 232 preferably includes a VLAN group information creating section 232a that creates the VLAN group information, and transmits the created VLAN group information to the VLAN client terminal.

The activation command control unit 233 executes an activation process of the VLAN group. Specifically, when the activation command control unit 233 receives the selection for the VLAN group to be activated from the user, it transmits an activation command to an activated relay server among the relay servers connected to the VLAN client terminal. The activation command is a command for notifying of activation of the VLAN group, and is transmitted together with activation time and VLAN group information of the VLAN group. The activation command control unit 233 refers to the relay server information stored in the relay server information storage unit 242, and determines whether or not the extracted relay server is activatable.

When the activation command control unit 233 receives the response signal in response to the activation command from the relay server, it extracts the IP address and the MAC address of the VLAN device from the response signal.

The virtual address control unit 234 preferably includes a virtual address creating unit 234a that creates virtual address information when it receives a response signal including the IP address and the MAC address of the VLAN devices, and transmits the created virtual address information to the relay server to which the first client terminal A1 is connected. When the virtual address control unit 234 receives the virtual address information and the initialization command, it stores the received virtual address information in the virtual address information storage unit 245.

When the VLAN group information is changed, the VLAN group information update unit 235 shares the updated VLAN group information with a VLAN client terminal and a relay server to which the VLAN client terminal is connected.

The IP packet processing unit 236 outputs the communication packet received from the LAN interface 221A to the client communication control unit 238. In addition, the IP packet processing unit 236 outputs the communication packet to the VLAN session control unit 237 when it receives the commutation packet including the virtual address via the VLAN interface 221B.

The VLAN session control unit 237 processes the communication packet including the virtual address, and allows the device session to function as a VLAN session. When the VLAN session control unit 237 is to transmit the communication packet including the virtual address using the VLAN session, it transmits the communication packet via the VLAN interface 221B.

The client communication control unit 238 processes the communication packet other than the VLAN session, and controls various communication in accordance with a protocol such as TCP/IP, UDP, and SIP via the LAN interface 221A.

The database storage unit 223 is a hard disk drive or a non-volatile RAM for example, and can store various data. The database storage unit 223 preferably includes a relay group information storage unit 241, a relay server information storage unit 242, a client terminal information storage unit 243, a VLAN group information storage unit 244, and virtual address information storage unit 245. The detail of information to be stored in the relay group information storage unit 241, the relay server information storage unit 242, the client terminal information storage unit 243, the VLAN group information storage unit 244, and the virtual address information storage unit 245 will be described later.

It should be noted that since the second client terminal A2, the third client terminal B1, the fourth client terminal B2, and the fifth client terminal C1 are preferably similar to the first client terminal A1, the explanation thereof will be omitted.

Figure 4:
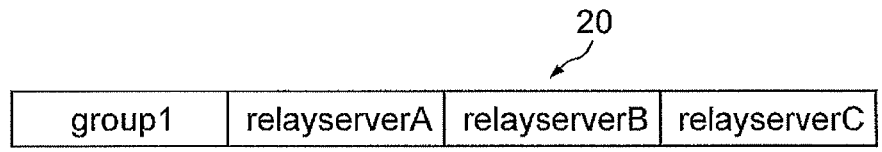
FIG. 4 is a view showing a schematic configuration of relay group information according to a preferred embodiment of the present invention.

FIG. 4 shows a schematic configuration of the relay group information 20 according to a preferred embodiment of the present invention. The relay group information 20 is preferably information indicating a summary of the relay groups in the relay communication system, and is stored in the relay group information storage unit 141 of the relay server and the relay group information storage unit 241 of the client terminal. FIG. 4 shows that first relay group is preferably defined by the first relay server A, the second relay server B, and the third relay server C.

Figure 5:
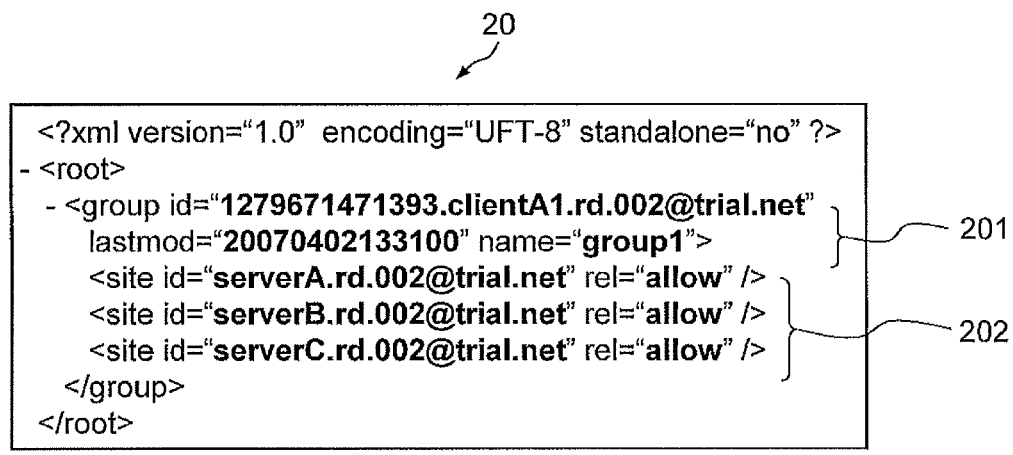
FIG. 5 is a view showing a detailed configuration of relay group information according to a preferred embodiment of the present invention.

FIG. 5 shows a detailed configuration of the relay group information 20. The relay group information 20 preferably includes upper information 201 and lower information 202.

The upper information 201 is information on the first relay group itself. "group id" indicates identification information of the relay group. "lastmod" indicates the latest update time of the relay group information. "name" indicates the name of the relay group.

The lower information 202 is information on the first relay server A, the second relay server B, and the third relay server C. "site id" indicates identification information of each relay server.

The relay group information 20 is shared among the first relay server A, the second relay server B, and the third relay server C, and is stored in the relay group information storage unit 141 of the relay servers. In addition, the relay group information 20 is shared between the relay server and the client terminal, and is stored in the relay group information storage unit 241 of the client terminals.

FIG. 6 shows a schematic configuration of the relay server information 30 in accordance with a preferred embodiment of the present invention. The relay server information 30 is information showing a summary of the relay servers and the client terminals defining the relay communication system, and is stored in the relay server information storage unit 142 of the relay servers and the relay server information storage unit 242 of the client terminals.

As shown in FIG. 6, the first client terminal A1 and the second client terminal A2 are connected to the first relay server A. The third client terminal B1 and the fourth client terminal B2 are connected to the second relay server B. The fifth client terminal C1 is connected to the third relay server C.

FIG. 7 shows a detailed configuration of the relay server information 30. The relay server information 30 preferably includes upper information 301-1, 301-2, 301-3, and lower information 302-1, 302-2, 302-3.

The upper information 301-1, 301-2, 301-3 is information on the relay servers. "site id" indicates identification information of the relay server. "name" indicates name of the relay server. "stat" indicates information on whether or not the relay server is activated.

The lower information 302-1, 302-2, 302-3 is information on the client terminal. "div" indicates name of division of the client terminal. "group" indicates identification information of the relay server to which the client terminal belongs. "id" indicates identification information of the client terminal. "name" indicates name of the client terminal. "site" indicates identification information of the relay server to which the client terminal logs in when the client terminal logs in.

The relay server information 30 is preferably shared among the first relay server A, the second relay server B, and the third relay server C, and is stored in the relay server information storage unit 142 of the relay servers. In addition, the relay server information 30 is shared among the relay servers and the client terminals, and is stored in the relay server information storage unit 242 of the client terminals.

When the relay server is being activated, "stat" of the upper information 301-1, 301-2, 301-3 is "active". When the relay server is not being activated, "stat" is blank. Accordingly, the information on whether or not the relay server is being activated is shared in the whole relay communication system.

When the client terminal is being logging onto the relay server, identification information of the relay server into which the client terminal logs onto is shown in "site" of the lower information 302-1, 302-2, 302-3. When the client terminal is not logging onto the relay server, "site" is blank. Accordingly, information on whether or not the client terminal is logging onto the relay server is shared in the whole relay communication system.

FIG. 8, FIG. 9, and FIG. 10 respectively show client terminal information 40, 50, 60 as specific non-limiting examples of the client terminal information in accordance with a preferred embodiment of the present invention. The client terminal information includes information regarding details of the client terminal defining the relay communication system, and is stored in the client terminal information storage unit 143 of the relay servers and the client terminal information storage unit 243 of the client terminals.

"addr" is address information of the client terminal, and indicates IP address of the client terminal, specifically. "div" indicates name of division of the client terminal. "expr" is expiration period information of the client terminal, and indicates registration expiration period of the client terminal, specifically. "group" indicates identification information of the relay group to which the client terminal belongs. "id" indicates identification information of the client terminal. "name" indicates name of the client terminal. "pass" indicates password of the client terminal. "port" is client terminal port information, and indicates port number of the client terminal, specifically.

The client terminal information 40, 50, and 60 are shared with the relay servers and the client terminals in the relay group, and are stored in the client terminal information storage unit 143 of the relay servers and in the client terminal information storage unit 243 of the client terminals.

VLAN group information is information including information of VLAN client terminals defining the VLAN group, information of the relay servers to which the VLAN client terminals are connected, and the session information among the relay servers.

FIG. 11 shows a detailed configuration of the VLAN group information 70 in accordance with a preferred embodiment of the present invention. The VLAN group information 70 preferably includes group information 71, VLAN client terminal information 72, and session information 73.

The group information 71 is information about the VLAN group. In the group information 71, "group" is identification information of the relay group defining the VLAN group. "id" indicates identification information of the VLAN group. "lastmod" indicates latest update time of the VLAN group information. "name" indicates name of the VLAN group.

The VLAN client terminal information 72 is information related to VLAN client terminals defining the VLAN group. "dev id" indicates identification information of the VLAN client terminals. In this example, the first client terminal A1, the third client terminal B1, the fourth client terminal B2, and the fifth client terminal C1 are the VLAN client terminals.

The session information 73 includes hub information and routing information. The hub information is identification information of the relay server to which the VLAN client terminal is connected. The routing information is information that defines communication paths among the relay servers, and includes "sp" and "ep". "sp" is a start point of the connection path, and a relay server indicated by the "sp" is on a connecting-side of the relay server. "ep" is an end point of the connection path, and a relay server indicated by the "ep" is on a connected-side of the connection path.

In this example, the hub information includes identification information of the first relay server A, the second relay server B, and the third relay server. As the routing information, a session is defined in which the start point is the first relay server A and the end point is the second relay server B. In addition, a session is defined in which the start point is the first relay server A and the end point is the third relay server C, and a session is defined in which the start point is the second relay server B and the endpoint is the third relay server C. Accordingly, in the session information 73, since the start point and the end point of the communication path among the relay servers are defined, the communication paths among the relay servers are prevented from overlapping each other.

The VLAN group information 70 is preferably shared between and VLAN client terminals and the relay servers to which the VLAN client terminal is connected, and is stored in the VLAN group information storage unit 244 of the VLAN client terminals and the VLAN group information storage unit 144 of the relay servers. On the other hand, the VLAN group information 70 may be shared only among the VLAN client terminals.

In this preferred embodiment below, a non-limiting example will be described in which the VLAN group information 70 is shared among the VLAN client terminals, and is stored in the VLAN group information storage unit 244 of the VLAN client terminals. The processes of creating and sharing the VLAN group information 70 will be described later in detail.

The virtual address information is preferably information including identification information of the VLAN device that is activatable as a client terminal of the VLAN group, a virtual IP address and a virtual MAC address. The virtual address information is stored in the virtual address information storage unit 245 of the VLAN device. In addition, the virtual address information may be stored in the virtual address information storage unit 145 of the relay server.

FIG. 12 shows a detailed configuration of the virtual address information 80 in accordance with a preferred embodiment of the present invention. The virtual address information 80 is associated with the identification information, the virtual IP address, and the virtual MAC address of the VLAN device. The virtual IP address and the virtual MAC address are preferably given such that they do not overlap the IP address and MAC address the VLAN devices actually use. In addition, the virtual IP address and virtual MAC address are given such that they do not overlap each other in the VLAN group.

In the virtual address information 80 of this example, the identification information, the virtual IP address and the virtual MAC address are associated with the first client terminal A1, the third client terminal B1, the fourth client terminal B2, and the fifth client terminal C1, as the VLAN devices.

As described later, since the virtual address information 80 is shared among the VLAN devices, the client terminal belonging to different LANs can communicate with each other as the VLAN devices. The processes of creating and sharing the virtual address information 80 will be described later in detail.

Figure 13:
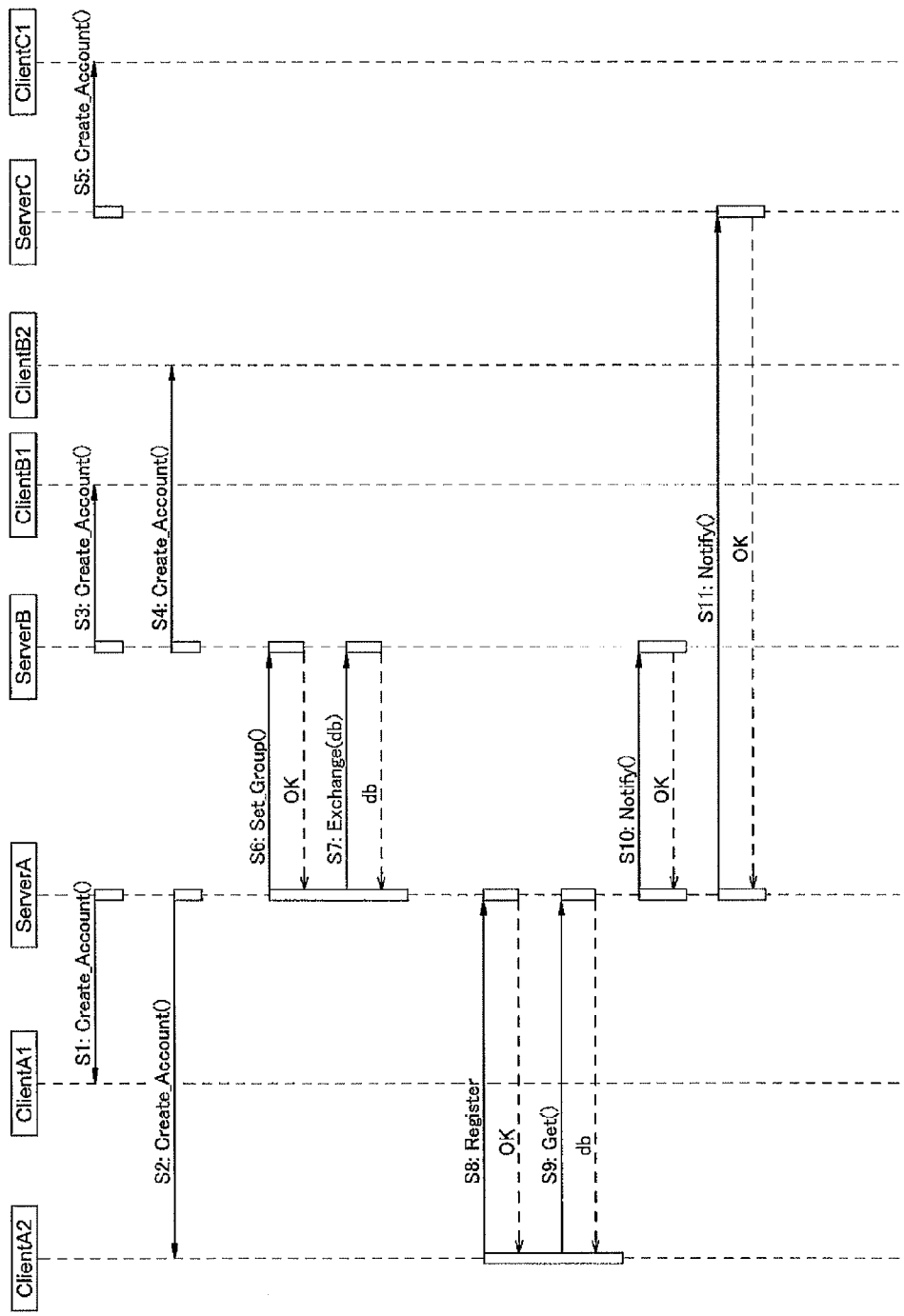
FIG. 13 is a view showing a process flow related to a construction of a relay group according to a preferred embodiment of the present invention.

Using a sequence diagram of FIG. 13, the initialization of the first relay group will be described. Specifically, FIG. 13 shows a flow of processes creating the relay group information, the relay server information, and the client terminal information in accordance with a preferred embodiment of the present invention.

The administrator of the first relay server A creates accounts for users of the first client terminal A1 and the second client terminal A2 (step S1, step S2: Create_Account ( )). The administrator of the second relay server B creates accounts for users of the third client terminal B1 and the fourth client terminal B2 (step S3, step S4: Create_Account ( )). The administrator of the third relay server C creates an account for a user of the fifth client terminal C1 (step S5: Create_Account ( )).

In the above-described processes, the first relay server A creates and stores the relay server information therein. The second relay server B creates and stores the relay server information therein. The third relay server C creates and stores the relay server information therein. The first relay server A creates and stores the client terminal information therein, the second relay server B creates and stores the client terminal information therein, and the third relay server C creates and stores the client terminal information therein.

FIG. 14, FIG. 15, and FIG. 16 respectively show relay server information 31-1, relay server information 31-2, and relay server information 31-3 in accordance with a preferred embodiment of the present invention. The relay server information 31-1 preferably includes information the first relay server A creates and stores. The relay server information 31-2 preferably includes information that the second relay server B creates and stores. The relay server information 31-3 preferably includes information the third relay server C creates and stores.

FIG. 14 shows relay server information 31-1. The upper information 311-1 is preferably information related to the first relay server A. As "site id", "serverA@trial.net" is set. As "name", "Server A" is set. As "stat", "active" is set.

The lower information 312-1 preferably includes information related to the first client terminal A1 and the second client terminal A2.

The information related to the first client terminal A1 will be described as follows. As "div", "dev" is set. As "group", "1279671471393.clientA1.rd.002@trial.net" is set. As "id, "clientA1.rd.002@ServerA.trial net" is set. As "name", "clientA1" is set. It should be noted that although "serverA trial net" is set as "site" in FIG. 14, meaning that a user of the first client terminal A1 is logging onto the first relay server A, "site" is, in fact, blank in steps S1 to S5 in FIG. 13.

The information related to the second client terminal A2 will be described as follows. As "div", "dev" is set. As "group" "1279671471393.clientA1.rd.002@trial.net" is set. As "id", "clientA2.rd.002@ serverA.trial.net" is set. As "name", "clientA2" is set. It should be noted that denotation of the "site" is similar to a case of the first client terminal A1.

The contents of the relay server information 31-2 and the relay server information 31-3, including upper information 311-2, upper information 311-3, lower information 312-2, and lower information 312-3, are preferably similar to the content of the relay server information 31-1, so the explanation thereof will be omitted.

The flow of processes related to creating the relay group information, the relay server information, and the client terminal information will be described, with reference again to FIG. 13. In FIG. 13, the first relay server A requests the second relay server B to send the construction group of the relay communication system (step S6: Set_Group ( ). The first relay server A and the second relay server B create the relay group information and store it therein. Next, the first relay server A requests the second relay server B to exchange the relay server information (step S7: Exchange (db)). Accordingly, the first relay server A transmits the relay server information to the second relay server, and the second relay server B transmits the relay server information to the first relay server A. The first relay server A and the second relay server B synthesize the relay server information to make new relay server information, and then store it therein. It should be noted that the processes similar to step S6 and step S7 are executed between the first relay server A and the third relay server C, and are executed between the second relay server B and the third relay server C. As a result, the common relay server information is shared among the first relay server A, the second relay server B, and the third relay server C.

A user of the second client terminal A2 inputs identification information of the second client terminal A2 and the password for logging onto the first relay server A (step S8: Register). The first relay server A refers to the client terminal information, and then authenticates the user of the second client terminal A2. The first relay server A updates the client terminal information.

Then, the second client terminal A2 requests the first relay server A to transmit the relay group information and the relay server information (step S9: Get ( ). The first relay server A transmits the relay group information and the relay server information to the second client terminal A2. The second client terminal A2 stores the relay group information and the relay server information therein.

The first relay server A refers to the relay server information, and determines that it should notify the second relay server B that the relay server information has been updated if it confirms "site" related to the second relay server B has become "active". Then, the first relay server A notifies the second relay server B that the relay server information has been updated (step S10: Notify ( )). The second relay server B updates the relay server information, and stores it therein. It should be noted that the first relay server A notifies the third relay server C as well that the relay server information has been updated (step S11: Notify ( )).

If the users of the first client terminal A1, the third client terminal B1, the fourth client terminal B2, or the fifth client terminal C1 log onto the relay server, the relay server information of the relay server is updated similarly. In addition, similarly, if the user of the client terminals logs off, the relay server information in the relay server is updated.

Also, the update of the relay server information is notified to the client terminals that are logging on.

Figure 17:
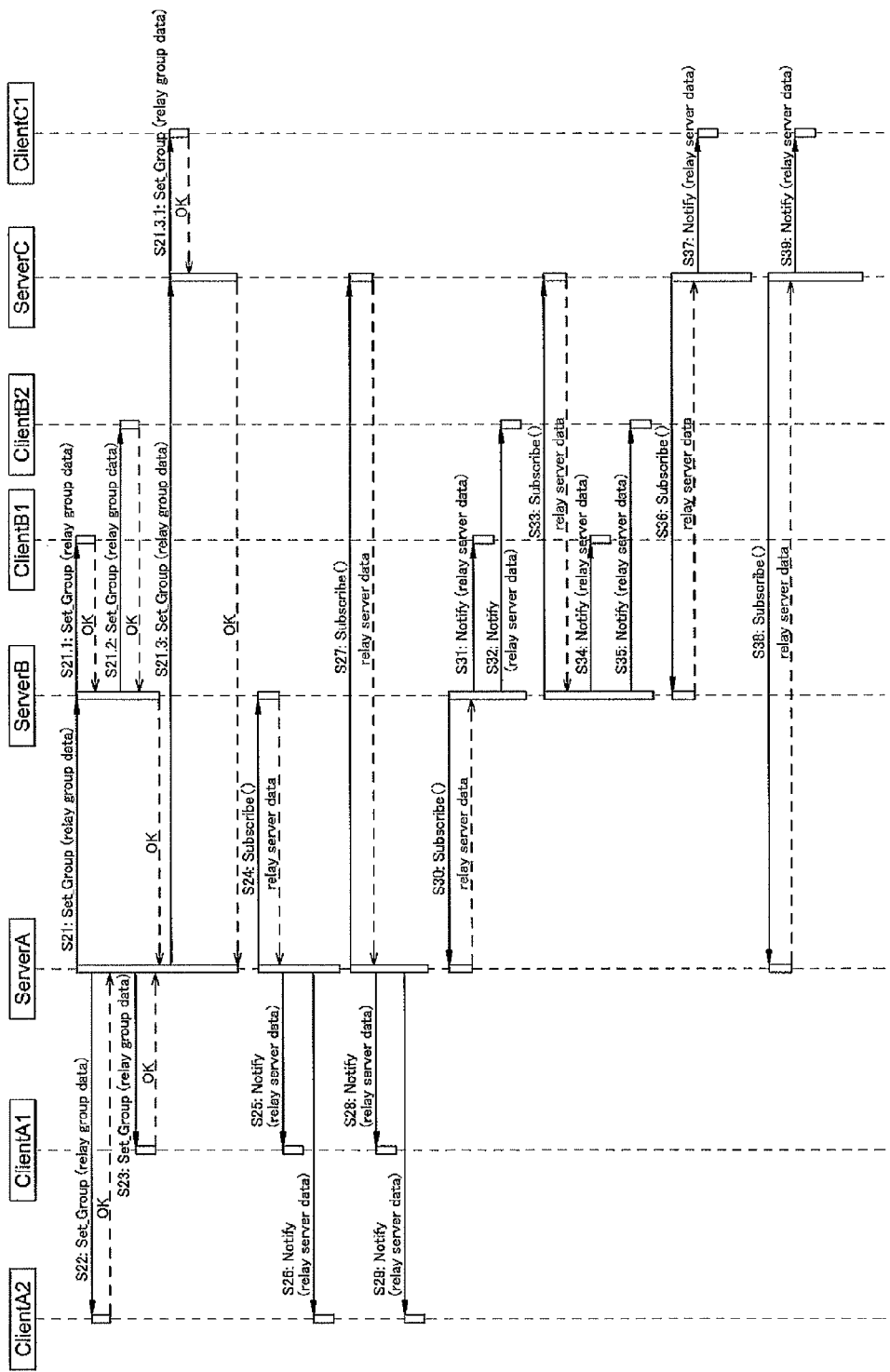
FIG. 17 is a view showing a flow process related to the sharing relay group information and relay server information according to a preferred embodiment of the present invention.

The share process when the information of the relay group is changed will be described with reference to FIG. 17. FIG. 17 is a view showing a flow of process related to the sharing of the relay group information and the relay server information in accordance with a preferred embodiment of the present invention.

In FIG. 17, if the first relay group is changed, the first relay server A transmits the changed relay group information to the second relay server B, for example (step S21: Set_Group (relay group information)). Then, the second relay server B transmits the relay group information to the third client terminal B1 and the fourth client terminal B2 (step S21.1 and step S21.2: Set_Group (relay group information)). If the OKs return from the third client terminal B1 and the fourth client terminal B2, the second relay server B returns OK to the first relay server A.

Furthermore, the first relay server A transmits the changed relay group information to the second client terminal A2 (step S22: Set_Group (relay group information)). The second client terminal A2 returns OK to the first relay server A. The first relay server A transmits the changed relay group information to the first client terminal A1 (step S23: Set_Group (relay group information)). The first client terminal A1 returns OK to the first relay server A.

The first relay server A transmits the changed relay group information to the third relay server C (step S21.3: Set_Group (relay group information)). Then, the third relay server C transmits the relay group information to the fifth client terminal C1 (step S21.3.1: Set_Group (relay group information)). If OK returns from the fifth client terminal C1, the third relay server C returns OK to the first relay server A.

According to the above-described processes, the whole of the relay servers and the client terminals share the relay group information.

The sharing of the relay server information will be described with reference again to FIG. 17. In this example, the process for sharing preferably uses a framework of event notification. In the event notification, a subscriber is an agent who requests state notification of a resource, a notifier is an agent who notifies status of the resource. If the status of the resource is changed during the subscription period, the notifier notifies the subscriber of the change.

The first relay server A subscribes the relay server information to the second relay server B (step S24: Subscribe ( ). If the status indicated by the relay server information has been changed, the second relay server B updates the relay server information held by the second relay server B. Then, the second relay server B transmits the updated relay server information to the first relay server A. The first relay server A updates the relay server information using the relay server information transmitted from the second relay server B. The first relay server A notifies the first client terminal A1 that the relay server information has been updated (step S25: Notify (relay server information)), and then notifies the second client terminal A2 (step S26: Notify (relay server information)).

Next, the first relay server A subscribes the relay server information to the third relay server C (step S27: Subscribe ( ). If the status indicated by the relay server information has been changed, the third relay server C updates the relay server information held by the third relay server C. Then, the third relay server C transmits the updated relay server information to the first relay server A. The first relay server A updates the relay server information using the relay server information transmitted from the third relay server C. The first relay server A notifies the first client terminal A1 that the relay server information has been updated (step S28: Notify (relay server information)), and notifies the second client terminal A2 (step S29: Notify (relay server information)).

The second relay server B subscribes the relay server information to the first relay server A (step S30: Subscribe ( )). If the status indicated by the relay server information has been changed, the first relay server A updates the relay server information held by the first relay server A. Then, the first relay server A transmits the updated relay server information to the second relay server B. The second relay server B updates the relay server information using the relay server information transmitted from the first relay server A. The second relay server B notifies the third client terminal B1 that the relay server information has been updated (step S31: Notify (relay group information)), and then notifies the fourth client terminal B2 (step S32: Notify (relay group information)).

The second relay server B subscribes the relay server information to the third relay server C (step S33: Subscribe ( )). If the status indicated by the relay server information is changed, the third relay server C updates the relay server information held by the third relay server C. Then, the third relay server C transmits the updated relay server information to the second relay server B. The second relay server B updates the relay server information using the relay server information transmitted from the third relay server C. The second relay server B notifies the third client terminal B1 that the relay server information has been updated (step S34: Notify (relay group information)), and then notifies the fourth client terminal B2 (step S35: Notify (relay group information)).

The third relay server C subscribes the relay server information to the second relay server B (step S36: Subscribe ( )). If the status indicated by the relay server information is changed, the second relay server B updates the relay server information held by the second relay server B. Then, the second relay server B transmits the updated relay server information to the third relay server C. The third relay server C updates the relay server information using the relay server information transmitted from the second relay server B. The third relay server C notifies the fifth client terminal C1 that the relay server information has been updated (step S37: Notify (relay group information)).

The third relay server C subscribes the relay server information to the first relay server A (step S38: Subscribe ( )). If the status indicated by relay server information is changed, the first relay server A updates the relay server information held by the first relay server A. Then, the first relay server A transmits the updated relay server information to the third relay server C. The third relay server C updates the relay server information using the relay server information transmitted from the first relay server A. The third relay server C notifies the fifth client terminal C1 that the relay server information has been updated (step S39: Notify (relay group information)).

According to the above-described processes, the first relay server A, the second relay server B, and the third relay server C preferably share the relay server information instantly when the relay server information is updated. Accordingly, the first relay server A, the second relay server B, and the third relay server C can preferably always know activation states of the other relay servers, and kinds and log-on status of the client terminals connected to relay servers.

In the relay communication system according to a preferred embodiment of the present invention, if the number and the connection states of the LANs and the client terminals are changed, one relay server instantly updates the relay group information, the relay server information, and the client terminal information depending on its content when recognizing the changes in state.

Then, one relay server instantly notifies other relay servers recited in the relay group information and the relay server information that the relay group information and the relay server information have been updated. In addition, one relay server instantly notifies the client terminals recited in the client terminal information that the relay group information, and the relay server information, have been updated.

However, one relay server will not instantly notify the other relay servers when it is determined that the other relay server is an unconnected state even if the other relay server is recited in the relay group information and the relay server information. In addition, one relay server will not instantly notify the client terminals when it is determined that the client terminals are in an unconnected state even if the client terminal is recited in the client terminal information.

Accordingly, information on changes in the number and the connection states of the LANs and the client terminals is preferably shared in the whole relay communication system in real time or substantially in real time.

After the information on the changes in the number and the connection states of the LANs and the client terminals in the relay communication system is shared, assume that a user using the client terminal appoints another client terminal for communication. In this case, the data is transmitted and received as follows.

Specifically, the client terminal transmits a communication packet including the client terminal information of the client information of the specified destination and data to be transmitted, to a relay server to which the client terminal is connected. The relay server, which has received the communication packet, refers to the relay server information, and confirms under which relay server in the relay group the appointed client terminal exists. In addition, the relay server confirms whether or not the relay server with the client terminals under the control thereof is in an activated state, and confirms whether or not the appointed client terminal is in a log-on state. Specifically, it is possible to determine that the relay sever is in an activated state by confirming "stat" of the upper information of the relay server information is set to "active". It is also possible to determine that the client terminal is in a logging-on state by confirming that the lower information "site" of the relay server information recites identification information of the relay server to which the client terminal logs on.

If it is confirmed that the relay server is in active state and the client terminal is in the logging-on state, the received communication packet is transmitted to the relay server with the appointed client terminal under the control thereof. In addition, the relay server, which has received communication packet, transmits the communication packet to the client terminal under the control of the relay server.

Figure 18:
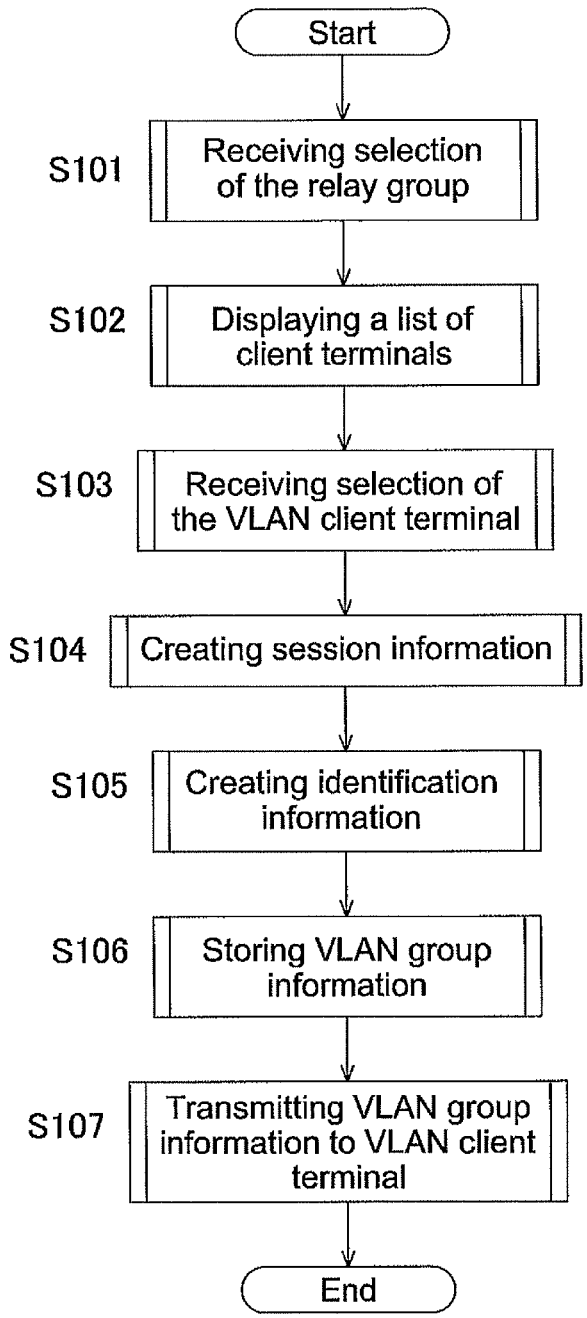
FIG. 18 is a flowchart showing a process that creates VLAN group information according to a preferred embodiment of the present invention.

Next, the creation and the sharing of the VLAN group information will be described with reference to FIG. 18. FIG. 18 is a flowchart showing a process of creating the VLAN group information in accordance with a preferred embodiment of the present invention. In a following example, while the information on the changes in the number and the connection states of the LANs and the client terminals are shared in the first relay group (refer to FIG. 17), the first client terminal A1 creates the VLAN group information. In addition, in this example, the first client terminal A1, the third client terminal B1, the fourth client terminal B2, and the fifth client terminal C1 in the first relay group are selected as the VLAN client terminals.

First, the VLAN group information creating section 232*a* of the VLAN group information control unit 232 in the first client terminal A1 receives selection of the relay group from a user (step S101). For example, the user selects a relay group by referring to the relay group information stored in the relay group information storage unit 241 with the display unit 224 and the operation input unit 225 of the first client terminal A1. In this example, the first relay group is selected as a relay group.

The VLAN group information creating section 232*a* extracts identification information of the first relay group by referring to the relay server information stored in the relay server information storage unit 242 when receiving the selection of the first relay group. It should be noted that the relay group information may be referred to instead of the relay server information.

When receiving the selection of the first relay group, the VLAN group information creating section 232*a* refers to the relay server information, and displays a list of the client terminals including the first relay group on the display unit 224 (step S102). After that, VLAN group information creating section 232*a* receives the selection of the VLAN client terminal from a user through the operation input unit 225 (step S103). At this time, the VLAN group information creating section 232*a* refers to the relay server information, and extracts identification information of the VLAN client terminal which has received the selection.

The VLAN group information creating section 232*a* creates session information after receiving the selection of the VLAN client terminal (step S104). Specifically, the VLAN group information creating section 232*a* determines a route configuration among the relay servers for establishing the hub session, and creates the session information.

For example, the VLAN group information creating section 232*a* determines that, the first relay server A is on a connecting-side, and the second relay server B is on a connected-side, regarding a session between the first relay server A and the second relay server B. Then, the VLAN group information creating section 232*a* inputs the identification number of the first relay server A into "sp", and inputs the identification number of the first relay server B into "ep". It should be noted that the session information created by the VLAN group information creating section 232*a* may be corrected by a user through the operation input unit 225 or the like.

After creating the session information, the VLAN group information creating section 232*a* creates identification information for identifying the VLAN group (step S105). After that, the VLAN group information creating section 232*a* stores the VLAN group information in VLAN group information storage unit 244, including the created identification information of the VLAN group, identification information of the VLAN client terminal, and the session information (step S106).

A non-limiting example of the VLAN group information created in this process is VLAN group information 70 shown in FIG. 11. As described above, the VLAN group information 70 preferably includes the group information 71, the VLAN client terminal information 72, and the session information 73. Specifically, the group information 71 preferably includes "1279671471393.clientA1.rd.002@trial.net" as identification information of the first relay group. The group information 71 preferably includes "1279672104671.clientA1.rd.002@trial.net" as the VLAN group identification information and "vlangroup1" as name of the VLAN group. Below, the VLAN group indicated by the VLAN group information 70 will be called as a first VLAN group.

The VLAN client terminal information 72 shows identification information of the first client terminal A1, the third client terminal B1, the fourth client terminal B2, and the fifth client terminal C1, which have been selected by the user.

In addition, the session information 73 preferably includes session information in which "sp" is the first relay server A and "ep" is the second relay server B. The session information 73 preferably includes session information in which "sp" is the first relay server A and "ep" is the third relay server C, and session information in which "sp" is the second relay server B and "ep" is the third relay server C.

The VLAN group information 70 is, after created as described above, transmitted to the VLAN client terminal (step S107).

Figure 19:
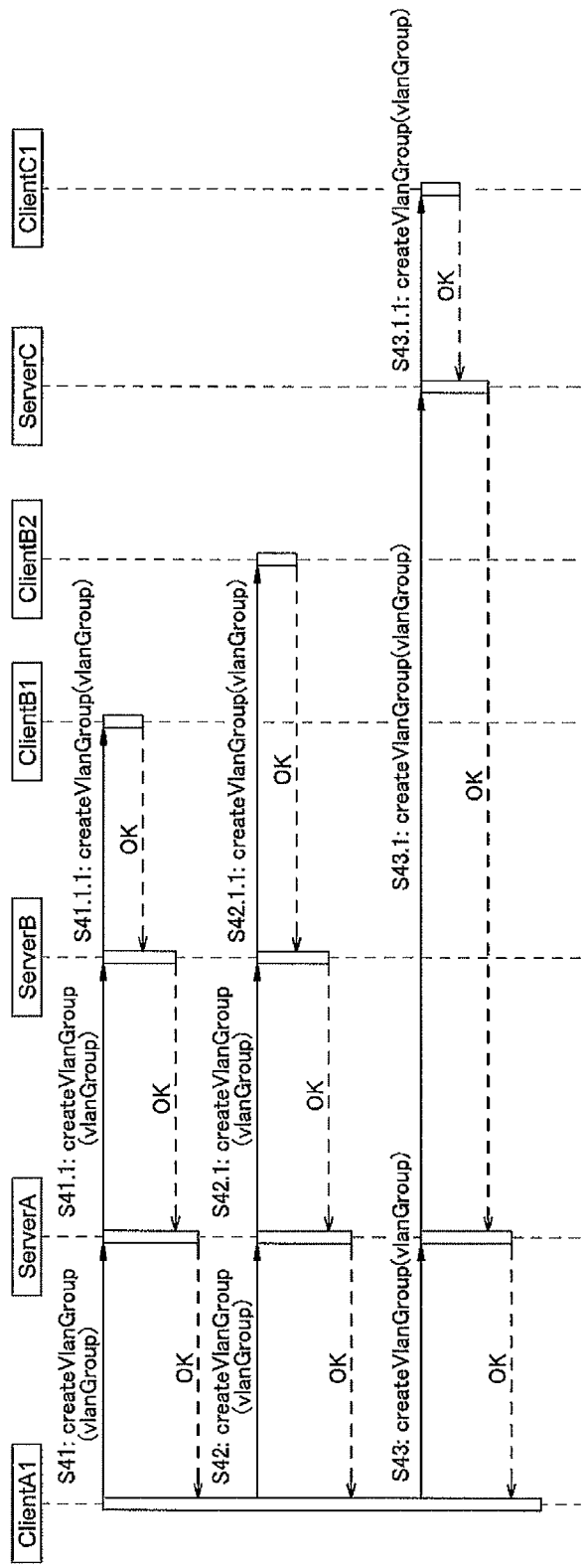
FIG. 19 is a view showing a flow process related to sharing VLAN group information according to a preferred embodiment of the present invention.

Next, with reference to the sequence diagram of FIG. 19, a process will be described in which the VLAN group information 70 is shared among VLAN client terminals. FIG. 19 is a view of showing a flow of process of sharing the VLAN group information in accordance with a preferred embodiment of the present invention. The process related to the sharing of the VLAN group information 70 is controlled by the VLAN group information control unit 132 of the relay servers and the VLAN group information control unit 232 of the client terminals.

The first client terminal A1, which has created the VLAN group information 70, transmits the VLAN group information 70 to the third client terminal B1 as a VLAN client terminal. Specifically, the first client terminal A1 first transmits the VLAN group information 70 to the first relay server A (step S41: createvlanGroup (vlanGroup)). The first relay server A transmits the received VLAN group information 70 to the second relay server B (step S41.1: createvlanGroup (vlanGroup)). The second relay server B transmits the VLAN group information 70 to the third client terminal B1 (step S41.1.1: createvlanGroup (vlanGroup)). After receiving the VLAN group information 70, the third client terminal B1 stores the received VLAN group information 70 in the VLAN group information storage unit 244, and returns OK to the second relay server B. In addition, the second relay server B returns OK to the first relay server A, and the first relay server A returns OK to the first client terminal A1.

Next, the first client terminal A1 transmits the VLAN group information 70 to the fourth client terminal B2 as a VLAN client terminal. Specifically, the first client terminal A1 transmits the VLAN group information 70 to the first relay server A (step S42: createvlanGroup (vlanGroup)). The first relay server A transmits the received VLAN group information 70 to the second relay server B (step S42.1: createvlanGroup (vlanGroup)). The second relay server B transmits the received VLAN group information 70 to the fourth client terminal B2 (step S42.1.1: createvlanGroup (vlanGroup)). After receiving the VLAN group information 70, the fourth client terminal B2 stores the received VLAN group information 70 in the VLAN group information storage unit 244, and returns OK to the second relay server B. In addition, the second relay server B returns OK to the first relay server A, and the first relay server A returns OK to the first client terminal A1.

Furthermore, the first client terminal A1 transmits the VLAN group information 70 to the fifth client terminal C1. Specifically, the first client terminal A1 transmits the VLAN group information 70 to the first relay server A (step S43: createvlanGroup (vlanGroup)). The first relay server A transmits the received VLAN group information 70 to the third relay server C (step S43.1: createvlanGroup (vlanGroup)). The third relay server C transmits the received VLAN group information to the fifth client terminal C1 (step S43.1.1: createvlanGroup (vlanGroup)). After receiving the VLAN group information 70, the fifth client terminal C1 stores the received VLAN group information 70 in the VLAN group information storage unit 244, and returns OK to the third relay server C. In addition, the third relay server C returns OK to the first relay server A, and the first relay server A returns OK to the first client terminal A1.

According to the above-described processes, all of the VLAN client terminals selected as client terminals defining the VLAN group share the VLAN group information 70. Accordingly, the preparation is performed for the VLAN session among the client terminals within the VLAN group.

It should be noted that, in the above-described process, the VLAN group information 70 may be shared among the relay servers to which the VLAN client terminals are connected as well as among the VLAN client terminals. In this case, when receiving the VLAN group information 70, the relay server preferably stores the VLAN group information 70 in the VLAN group information storage unit 144.

Figure 20:
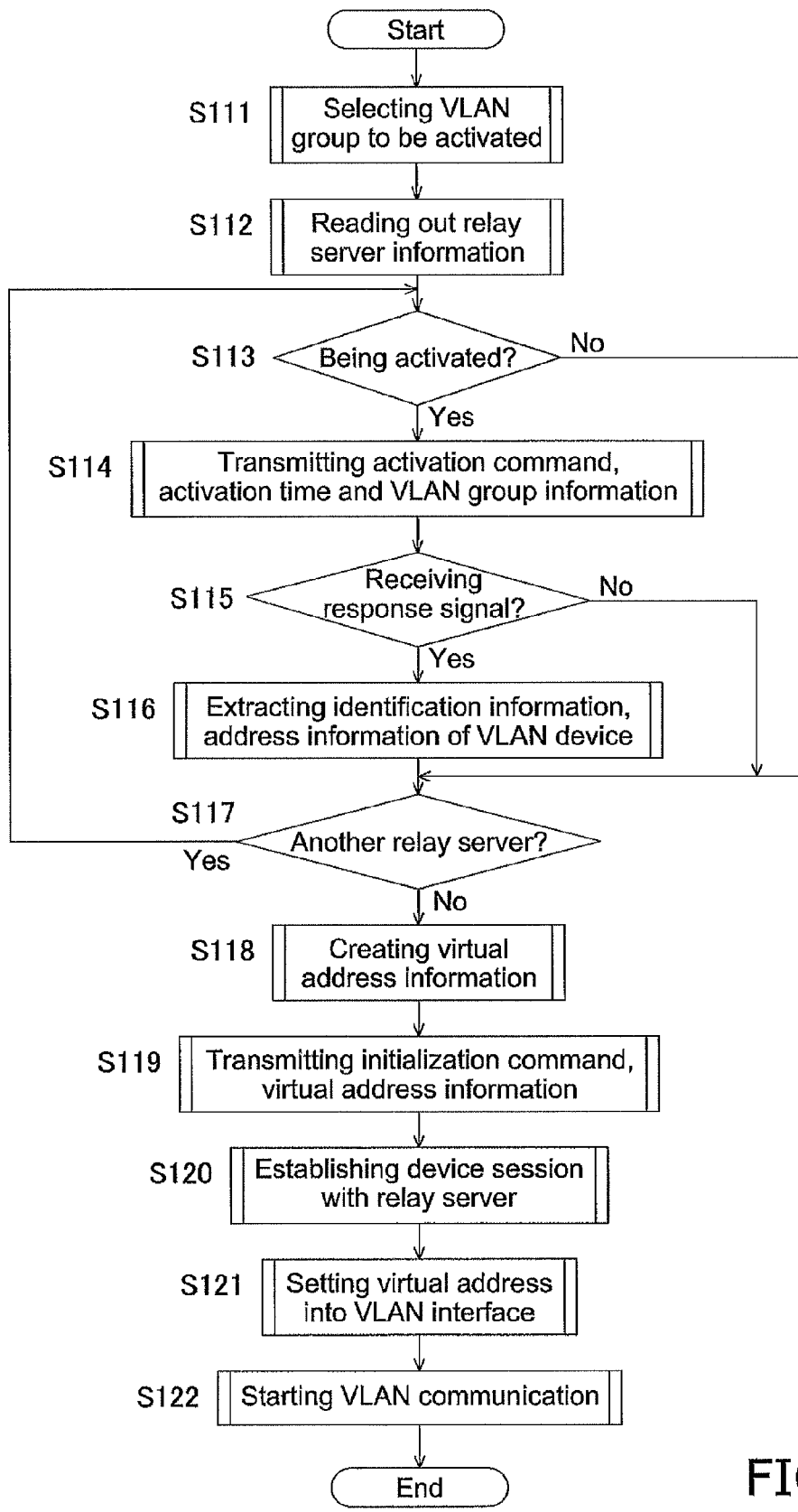
FIG. 20 is a flowchart showing a process that establishes a VLAN session by client terminals according to a preferred embodiment of the present invention.

In a relay communication system of a preferred embodiment of the present invention, a VLAN session is established in accordance with the VLAN group information 70 created and shared according to the above-described processes, so that the client terminals can communicate with each other as VLAN devices via a plurality of relay servers as a hub. Hereinafter, processes of establishing the VLAN session process and starting of the VLAN communication in a client terminal which receives activation instruction of the VLAN group information will be described with reference to FIG. 20. FIG. 20 shows a flowchart showing a process of establishing the VLAN session by the client terminal in accordance with a preferred embodiment of the present invention.

When a VLAN client terminal defining the VLAN group or a relay server to which the VLAN client terminal is connected receives an activation instruction of the VLAN group from a user, the process of establishing the VLAN session is started. In this example, the first client terminal A1 receives an activation instruction of the first VLAN groups indicated in the VLAN group information 70 from a user. In this case, the first client terminal A1, the third client terminal B1, the fourth client terminal B2, and the fifth client terminal C1 are VLAN devices.

First, the activation command control unit 233 of the first client terminal A1 receives selection of the VLAN group to be activated (step S111). Specifically, the activation command control unit 233 displays on the display unit 224 a list of the VLAN group information stored in the VLAN group information storage unit 244, and receives a selection of the VLAN group to be activated via the operation input unit 225. In this example, the first VLAN group indicated by the VLAN group information 70 is selected.

After receiving the selection of the first VLAN group, the activation command control unit 233 reads out the information of the relay server from the VLAN group information 70 (step S112). Specifically, the activation command control unit 233 reads out identification information of a relay server which serves as a hub from the session information 73 of the VLAN group information 70. At this time, the activation command control unit 233 reads out the information via a filtering unit such that the identification information of the relay servers are not overlapped with each other. In this example, the activation command control unit 233 reads out the identification information of the first relay server A, the second relay server B, and the third relay server C.

Next, the activation command control unit 233 performs processes of step S113 through step S116. Specifically, the activation command control unit 223 refers to the relay server information stored in the relay server information storage unit 242, and determines whether or not a relay sever among the read-out relay servers is activated to which a VLAN client terminal other than the first client terminal A1 is connected (step S113). Then, the activation command control unit 233 performs a process of step S114 through step S116 on the activated relay servers. In this example, the processes of step S114 through step S116 are preferably performed on the second relay server B and the third relay server C, which relay servers to which the VLAN client terminals are connected except the first client terminal A1.

First, the activation command control unit 233 refers to the relay server information stored in the relay server information storage unit 242, and determines whether or not the second relay server B is activated. Specifically, the activation command control unit 233 confirms that the upper information "stat" of the relay server information is set as "active" in order to determine whether or not the second relay server B is activatable. If the second relay server B is activated, the activation command control unit 233 transmits activation information including the activation command, the activation time and the VLAN group information 70 to the second relay server B (step S114). The activation command is a command of notifying the activation of the VLAN group. At this time, the second relay server B, after receiving the activation information, stores the VLAN group information 70 in the VLAN group information storage unit 144. On the other hand, according to the sharing process of the VLAN group information, if the VLAN group information 70 is shared, not only among the VLAN client terminals but also between the second relay server B and the third relay server C, it is acceptable that the transmission of the VLAN group information 70 may be omitted, and only the identification information of the first VLAN group may be transmitted.

Next, the activation command control unit 233 receives a response signal from the second relay server B. Here, the response signal from the second relay server B includes the identification information, the IP address and the MAC address of the VLAN device among the VLAN client terminals connected to the second relay server B. The process of creating the response signal by the second relay server B will be described later.

The activation command control unit 233, after receiving the response signal from the second relay server B (Yes at step S115), extracts the identification information, the IP address, and the MAC address of the VLAN device from the received response signal (step S116).

After that, the activation command control unit 233 refers to the relay server information again, and determines whether or not there is another relay server by which the processes of step S113 through step S116 should be performed (step S117). If there is another relay server (Yes at step S117), the activation command control unit 233 performs processes of step S113 through step S116 again on the other relay servers.

Hereinafter, at step S115, a non-limiting example will be described in which a response signal is received from the second relay server B and the third relay server C.

Figure 21:
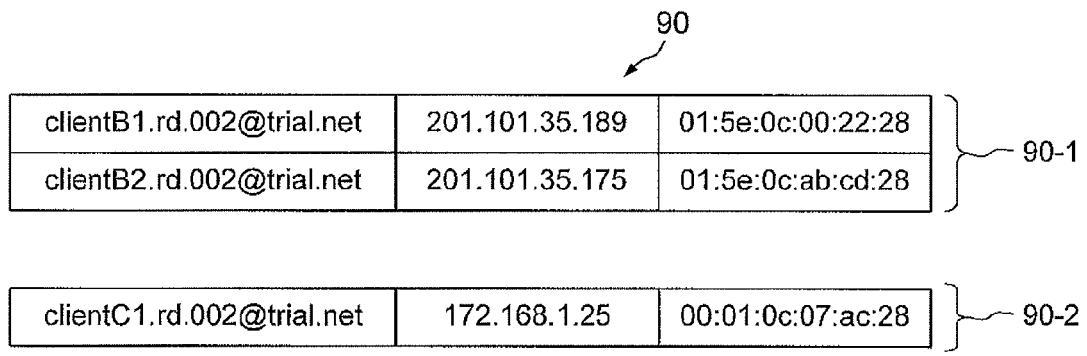
FIG. 21 is a view showing a non-limiting example of the first extraction information related to the IP address and the MAC address of the VLAN devices according to a preferred embodiment of the present invention.

FIG. 21 shows a non-limiting example of the first extraction information related to the IP address and the MAC address of the VLAN device according to a preferred embodiment of the present invention. The first extraction information 90 preferably includes the identification information, the IP address and the MAC address of the VLAN device extracted from the response signal at step S116. The first extraction information 90-1 shown in FIG. 21 is the extraction information extracted from the response signal received from the second relay server B, and the first extraction information 90-2 is the extracted signal extracted from the response signal received from the third relay server C. The first extraction information 90-1 includes identification information, the IP address and the MAC address of the third client terminal B1 and the fourth client terminal B2, which are VLAN devices connected to the second relay server B. The first extraction information 90-2 includes the identification information, the IP address and the MAC address of the fifth client terminal C1, which is a VLAN device connected to the third relay server C.

If it is determined that the relay server is not activated (No at step S113) and no response signal is received from the relay server (No at step S115), a process proceeds through step S117.

If it is determined that the other relay server exists (No at step S117), then the virtual address creating unit 234*a* of the virtual address control unit 234 creates the virtual address information (step S118). The virtual address information includes virtual IP address and virtual MAC address to be given to the VLAN devices.

Figure 22:
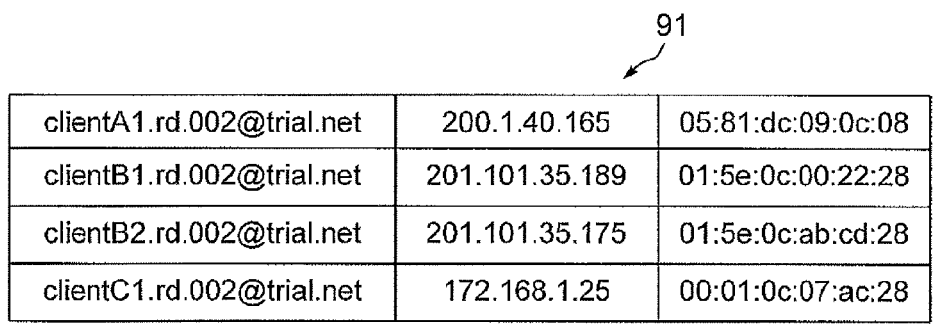
FIG. 22 is a view showing a non-limiting example of second extraction information, which was formed by adding an IP address and a MAC address of a first client terminal to first extraction information according to a preferred embodiment of the present invention.

A process of creating the virtual address will be described with reference to FIG. 12, FIG. 21 and FIG. 22. FIG. 22 shows a non-limiting example of the second extraction information in accordance with a preferred embodiment of the present invention, which is formed by adding the IP address and the MAC address of the first client terminal A1 to the first extraction information in FIG. 21.

The virtual address creating unit 234a preferably first adds the identification information, the IP address and MAC address of the first client terminal A1 to the first extraction information 90. Then, the virtual address creating unit 234a creates the second extraction information 91 that includes all of information of the first client terminal A1 and the VLAN devices extracted at step S116. As shown in FIG. 22, in the second extraction information 91, the identification information, the IP address and the MAC address of the first client terminal A1, the third client terminal B1, the fourth client terminal B2, and the fifth client terminal C1 are combined in one table.

Next, the virtual address creating unit 234a creates virtual address information, based on the IP address and MAC address indicated by the second extraction information 91. Specifically, the virtual address creating unit 234a assigns IP address that is not overlapped with IP address indicated by the second extraction information 91 to the VLAN devices, as virtual IP addresses. In addition, the virtual address creating unit 234a assigns MAC address that is not overlapped with the MAC address indicated by the second extraction information 91 to the VLAN devices, as a virtual MAC address. In addition, the virtual address creating unit 234a assigns the virtual IP address and the virtual MAC address to the VLAN devices such that the virtual IP address and the virtual MAC address are not overlapped with each other among the VLAN devices. In this example, different numbers are given to the end of the virtual IP address and the virtual MAC address in order not to overlap the virtual addresses among the VLAN devices.

Virtual address information created according to the above-described process is the virtual address information 80 shown in FIG. 12. In this example, virtual IP address "117.112.0.1" and virtual MAC address "00.11.22:f0.00.01 are preferably given to the first client terminal A1, which can be identified by the identification information "clientA1.rd.002@trial.net". In addition, virtual IP address "117.112.0.2" and virtual MAC address "00.11.22:f0.00.02" are preferably given to the third client terminal B1, which can be identified by the identification information "clientB1.rd.002@trial.net". The virtual IP address "117.112.0.3" and virtual MAC address "00.11.22:f0.00.03" are preferably given to the fourth client terminal B2, which can be identified by the identification information "clientB2.rd.002@trial.net". To the fifth client terminal C1, which can be identified with the identification information "clientC1.rd.002@trial.net", the virtual IP address "117.112.0.4" and the virtual MAC address "00.11.22: f0.00.04" are preferably given.

Next, the virtual address control unit 234 transmits the created virtual address information 80 together with the initialization command to a relay server serving as a hub (step S119). The initialization command is a command related to the initialization of the VLAN interface and including "1279672104671.clientA1.rd.002@trial.net" as the identification information of the first VLAN group. In this example, the virtual address control unit 234 transmits the created virtual address information 80 and the initialization command to the first relay server A, the second relay server B, and the third relay server C.

At this time, the first relay server A, the second relay server B, and the third relay server C, which have received the virtual address information 80 and the initialization command, establish a hub session among the relay servers with reference to the session information 73 of the VLAN group information 70. The hub session between the relay servers will be described later.

After that, the VLAN session control unit 237 performs a process of establishing a device session with the first relay server A, to which the first client terminal A1 is connected (step S120). In detail, OK is returned corresponding to the request of establishing the device session from the first relay server A, allowing the device session to serve as a VLAN session. At this time, a device session is established among the second relay server B, the third client terminal B1, and the fourth client terminal B2. A device session is also established between the third relay server C and the fifth client terminal C1.

As described above, in the VLAN group, when the VLAN session is established including the hub session and the device session, the VLAN session control unit 237 initializes the VLAN interface 221B of the first client terminal A1, and sets the virtual address for the VLAN interface 221B. Specifically, the VLAN session control unit 237 sets the virtual IP address and the virtual MAC address of the virtual address information 80 in the VLAN interface 221B of the first client terminal A1 (step S121). At this time, the third client terminal B1, the fourth client terminal B2, and the fifth client terminal C1 also preferably set the virtual IP address and virtual MAC address of the virtual address information 80 in the VLAN interface of the first client terminal A1 (step S121).

When the virtual address is set in the VLAN devices according to the above-described process using the virtual address and the VLAN session, the client terminals can communicate with each other as VLAN devices (step S122).

Next, a process of establishing the VLAN session and starting of the VLAN communication in the relay server which has received the activation information from a client terminal which has accepted the activation instruction of the VLAN group, will be described. In this example, a process by the second relay server B, which has received the activation information including the activation command, the activation time and the VLAN group information 70 from the first client terminal A1 (refer to step S114 in FIG. 20). It should be noted that a process by the third relay server C, which has received the activation information from the first client terminal A1, will be omitted because it is similar to the process of the second relay server B.

The activation command control unit 133 of the second relay server B extracts, when receiving from the first client terminal A1 the activation command, the activation time and the VLAN group information 70, the identification information of the VLAN group from the VLAN group information 70. In this example, the activation command control unit 133 preferably extracts "1279672104671.clientA1.rd.002@trial.net" from the VLAN group information 70. Then, the activation command control unit 133 confirms that the first VLAN group including this identification information is not activated, and extracts the VLAN client terminals connected to the second relay server B, from the VLAN group information 70. In this example, the activation command control unit 133 preferably extracts the third client terminal B1 and the fourth client terminal B2 as VLAN client terminals.

Next, the activation command control unit 133 determines whether or not the third client terminal B1 and the fourth client terminal B2 are the VLAN devices. The phrase "VLAN devices" refers to client terminals that are currently logging in and not joining other VLAN groups. Specifically, the activation command control unit 133 refers to the relay server information stored in the relay server information storage unit 142, and determines whether or not the third client terminal B1 and the fourth client terminal B2 are logging in. In addition, the activation command control unit 133 transmits the activation command to the third client terminal B1 and the fourth client terminal B2, which are logging in. Then, receiving OK signal to the activation command from the third client terminal B1 and the fourth client terminal B2, the activation command control unit 133 determines that the third client terminal B1 and the fourth client terminal B2 are VLAN devices.

After that, the activation command control unit 133 transmits the response signal to the first client terminal A1. The response signal includes the identification information, the IP address and the MAC address of the third client terminal B1 and the fourth client terminal B2. Here, the activation command control unit 133 communicates with the third client terminal B1 and the fourth client terminal B2, which are logging in, using IP communication with the LAN. Accordingly, the activation command control unit 133 does not have to request the third client terminal B1 and the fourth client terminal B2 to send the IP address and the MAC address of the third client terminal B1 and the fourth client terminal B2. The first client terminal A1, when receiving the response signal, creates the virtual address information 80 based on the received response signal (refer to step S115 and step S116 in FIG. 20).

Figure 23:
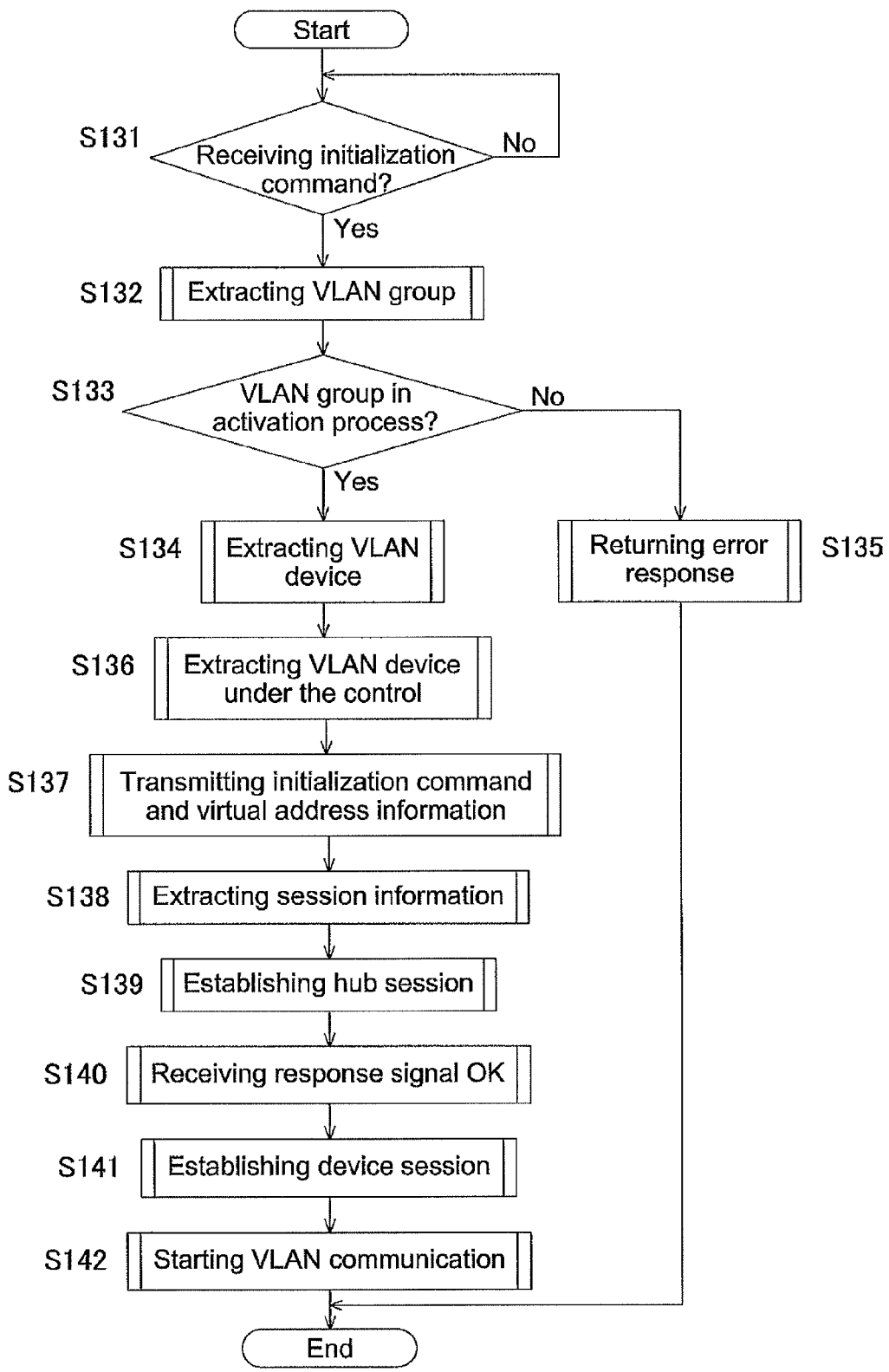
FIG. 23 is a flowchart showing a process of the relay server that has received the initialization command establishing the VLAN session according to a preferred embodiment of the present invention.

Next, a process when the second relay server B receives the initialization command (refer to step S119 in FIG. 20) and the virtual address information 80 created by the first client terminal A1 will be described with reference to FIG. 23. FIG. 23 is a flowchart showing a process of establishing the VLAN session in the relay server that has received the initialization command in accordance with a preferred embodiment of the present invention. The operation of the third relay server C which has received the virtual address information 80 and the initialization command from the first client terminal A1 is similar to the process of the second relay server B, so the explanation about thereof will be omitted.

The VLAN session control unit 135 of the second relay server B, when receiving the virtual address information 80 and the initialization command from the first client terminal A1 (Yes at step S131), extracts identification information of the VLAN group from the initialization command (step S132). In this example, the VLAN session control unit 135 preferably extracts "1279672104671.clientA1.rd.002@trial.net".

Next, the VLAN session control unit 135 determines whether or not the first VLAN group identified by the extracted identification information is in an activation process (step S133). If the first VLAN group is not in the activation process, an error reply is returned to the first client terminal A1 (step S135), and the process is finished.

On the other hand, if the first VLAN group is in the activation process, the VLAN session control unit 135 extracts the VLAN device from virtual address information 80 (step S134). In this example, the VLAN session control unit 135 extracts the first client terminal A1, the third client terminal B1, the fourth client terminal B2, and the fifth client terminal C1, as VLAN devices. Next, the VLAN session control unit 135 refers to the VLAN group information 70 stored in the VLAN group information storage unit 144, and further extracts the VLAN devices under the control of the already extracted VLAN devices, i.e., the VLAN device connected to the second relay server B (step S136). In this example, the third client terminal B1 and the fourth client terminal B2 are extracted. After that, the VLAN session control unit 135 forwards the received initialization command and the virtual address information 80 to the VLAN devices under the control thereof (step S137). In addition, to the VLAN devices connected to the relay servers except the second relay server B, the VLAN session control unit 135 transmits, with reference to the VLAN group information 70, the initialization command and the virtual address information 80 via the relay server.

Next, the VLAN session control unit 135 extracts the session information 73 from the VLAN group information 70 (step S138). After extracting the session information 73, the VLAN session control unit 135 refers to the session information 73, and establishes a hub session in which the second relay server is set as "sp" and that has not been established yet (step S139). In this example, the VLAN session control unit 135 establishes a hub session with the third relay server C, which is set as "ep". At this time, in the first relay server A too, a process is preferably performed to establish a hub session in which the second relay server is set as "sp" and that has not been established yet.

After receiving a response signal meaning OK to the establishment of the hub session from the third relay server C (step S140), the VLAN session control unit 135 refers to the VLAN group information 70, and establishes a device session with the VLAN devices connected to the second relay server (step S141). In this example, the VLAN session control unit 135 refers to the VLAN client terminal information 72 of the VLAN group information 70, and establishes a device session with the third client terminal B1 and the fourth client terminal B2.

After that, after receiving the response signal meaning OK from the third client terminal B1 and the fourth client terminal B2, the client terminals can communicate with each other as VLAN devices using the virtual address and the VLAN session (step S142).

Figure 24:
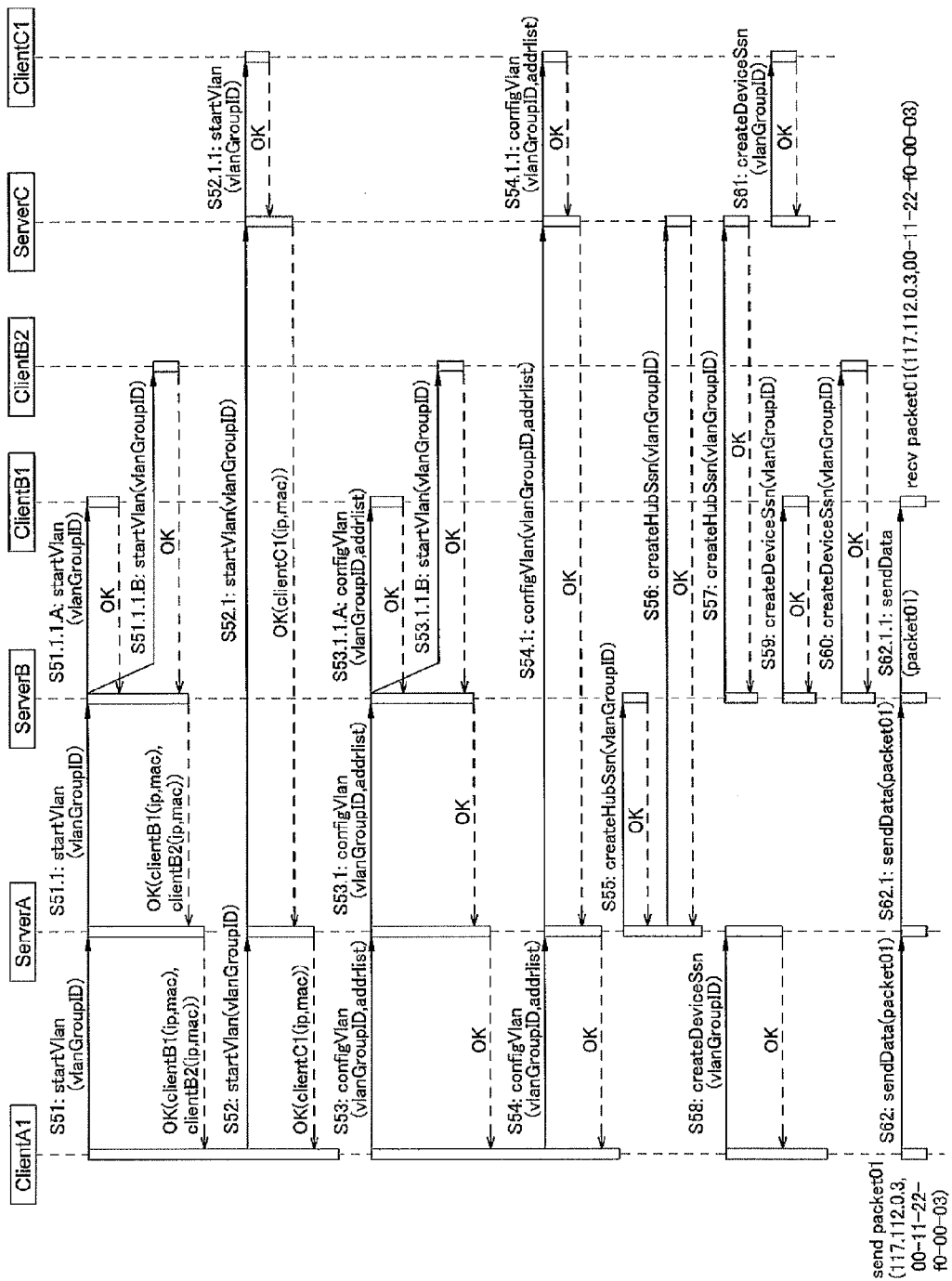
FIG. 24 is a view showing a non-limiting example of a process flow related to establishment of a VLAN session according to a preferred embodiment of the present invention.

With reference to a sequence diagram of FIG. 24, a flow of data when the VLAN session is established will be described. FIG. 24 is a view showing a non-limiting example of a flow of process related to establishment of the VLAN session in accordance with a preferred embodiment of the present invention.

Hereinafter, a process of establishing the VLAN session in the first VLAN group will be described. In this example, the first client terminal A1 receives an activation instruction of the first VLAN group indicated by the VLAN group information 70 shown in FIG. 11 from a user, and creates the virtual address information 80 shown in FIG. 12. The VLAN device is the first client terminal A1, the third client terminal B1, the fourth client terminal B2, and the fifth client terminal C1.

During this time, the relay servers in the first relay group communicate, using the ordinary IP address and MAC address, with the activated other relay servers in the first relay group via the WAN interface. And, among the relay servers, change in the connection state in the first relay group is shared. The activated client terminals in the first relay group communicate with the relay servers to which the client terminals are connected via the LAN interface. And, between the client terminal and the relay server, the change in the connection state in the relay communication system is shared.

First, the first client terminal A1 transmits, via the first relay server A, the activation information to the second relay server B, which serves as a hub in the VLAN group and is in active state (step S51: StartVlan (vlanGroupID), step S51.1: StartVlan (vlanGroupID)). The second relay server B extracts, referring to the VLAN group information 70, the third client terminal B1 and the fourth client terminal B2, which are the VLAN client terminals connected to the second relay server B. Then, the second relay server B determines whether or not the third client terminal B1 and the fourth client terminal B2 are the VLAN devices, and then transmits the activation information. Specifically, the second relay server B transmits the activation information to the third client terminal B1, which is the VLAN device (step S51.1.1.A: StartVlan (vlanGroupID)). The second relay server B transmits the activation information to the fourth client terminal B2, which is the VLAN device (step S51.1.1.B: StartVlan (vlanGroupID)).

After receiving OK from the third client terminal B1 and the fourth client terminal B2, the second relay server B transmits a response signal (OK(clientB1(ip,mac), clientB2(ip,mac))) to the first client terminal A1 via the first relay server A. The response signal includes identification information, the IP address and the MAC address of the third client terminal B1, and the fourth client terminal B2.

In addition, the first client terminal A1 transmits, via the first relay server A, the activation information to the third relay server C, which serves as a hub in the VLAN group and in an activated state (step S52: StartVlan (vlanGroupID), step S52.1: StartVlan (vlanGroupID)). The third relay server C refers to the VLAN group information, and extracts the fifth client terminal C1, which is a VLAN client terminal connected to the third relay server C. Then, the third relay server C determines whether or not the fifth client terminal C1 is a VLAN device, and then transmits the activation information to the fifth client terminal C1 (step S52.1.1: StartVlan (vlanGroupID)).

After receiving OK from the fifth client terminal C1, the third relay server C transmits the response signal (OK (clientC1(ip,mac))) to the first client terminal A1 via the first relay server A. The response signal includes the identification information, the IP address and the MAC address of the fifth client terminal C1.

Next, the first client terminal A1 performs a process of extracting from the response signal and of creating the virtual address information 80 (refer to S116, S118 in FIG. 20), and transmits the initialization command and the created virtual address information 80 to a relay server serving as hub. First, the first client terminal A1 transmits the initialization command and the virtual address information 80 to the second relay server B via the first relay server A (step S53: configVlan (vlanGroupID, addrList), step S53.1: configVlan (vlanGroupID, addrList)). Next, the second relay server B transmits the initialization command and the virtual address information 80 to the third client terminal B1 (step S53.1.1.A: configVlan (vlanGroupID, addrList)), which has been extracted (refer to step S131 through step S134 and step S136 in FIG. 23). Furthermore, the second relay server B similarly transmits the initialization command and the virtual address information to the fourth client terminal B2 (step S53.1.1.B: configVlan (vlanGroupID, addrList)). After receiving OK from the third client terminal B1 and the fourth client terminal B2, the second relay server B returns OK to the first relay server A. After receiving OK, the first relay server A returns OK to the first client terminal A1.

Moreover, the first client terminal A1 transmits the initialization command and the virtual address information 80 to the third relay server C via the first relay server A (step S54: configVlan (vlanGroupID, addrList), step S54.1: configVlan (vlanGroupID, addrList)). Next, the third relay server C forwards the initialization command and the virtual address information 80 to the fifth client terminal C1 (step S54.1.1: configVlan (vlanGroupID, addrList)), which has been extracted (refer to step S131 through step S134 and step S136 in FIG. 23). After receiving OK from the fifth client terminal C1, the third relay server C returns OK to the first relay server A. After receiving OK, the first relay server A returns OK to the first client terminal A1. According to the above-described process, the virtual address information 80 is transmitted to all of the VLAN devices in the first VLAN group.

After that, a relay server serving as a hub refers to session information 73 of the VLAN group information 70, and establishes a hub session in which the relay server is preferably set as "sp" but that has not been established yet. In this example, all of the hub sessions have not been established yet. Therefore, the first relay server A, which is designated as "sp", requests the second relay server B, in which the first relay server A is designated as "ep", to establish a hub session (step S55: createHubSsn (vlanGroupID)). After receiving OK from the second relay server B, a hub session is established between the first relay server A and the second relay server B. In addition, the first relay server A, which is designated as "sp", requests the third relay server C, which is designated as "ep", to establish a hub session (step S56: createHubSsn (vlanGroupID)). After receiving OK from the third relay server C, a hub session is established between the first relay server A and the third relay server C.

Furthermore, the second relay server B, which is designated as "sp", requests the third relay server C, which is designated as "ep", to establish a hub session (step S57: createHubSsn (vlanGroupID)). After receiving OK from the third relay server C, a hub session is established between the second relay server B and the third relay server C.

After the hub session is established, a relay server serving as a hub establishes a device session with a VLAN device connected to the relay server. First of all, the first relay server A requests the first client terminal A1 to establish a device session (step S58: createDeviceSsn (vlanGroupID)). After receiving OK from the first client terminal A1, a device session is established between the first relay server A and the first client terminal A1.

Moreover, the second relay server B requests the third client terminal B1 to establish the device session (step S59: createDeviceSsn (vlanGroupID)). After OK is returned from the third client terminal B1, a device session is established between the second relay server B and the third client terminal B1. The second relay server B requests the fourth client terminal B2 to establish a device session (step S60: createDeviceSsn (vlanGroupID)). After OK is returned from the fourth client terminal B2, a device session is established between the second relay server B and the fourth client terminal B2.

Moreover, the third relay server C requests the fifth client terminal C1 to establish a device session (step S61: createDeviceSsn (vlanGroupID)). After OK is returned from the fifth client terminal C1, a device session is established between the third relay server C and the fifth client terminal C1.

As described above, after the VLAN session including the hub session and the device session is established in the VLAN group, the VLAN devices initialize the VLAN interfaces of the VLAN devices, and set the virtual addresses in the VLAN interfaces. After the virtual address is set in the VLAN devices, the VLAN device can communicate with each other as VLAN devices using the virtual address and the VLAN session.

For example, the first client terminal A1, which has virtual IP address of "117.112.0.1" and virtual MAC address of "00.11.22:f0:00:01", can forward data, via the VLAN session, to the third client terminal B1, which has virtual IP address of "117.112.0.3" and virtual MAC address of "00.11.22:f0:00:03". Specifically, the first client terminal A1 transmits, via the device session, the communication packet to the first relay server A (step S62: sendData (packet01)). The communication packet includes virtual address of the third client terminal B1 as a transmit target, and data to be transmitted. Next, the first relay server A transmits the communication packet to the second relay server B via the hub session (step S62.1: sendData (packet01)). After that, the second relay server B transmits the communication packet to the third client terminal B1 via the device session (step S62.1.1: sendData (packet01)).

In the relay system of this preferred embodiment, as described above, the VLAN group information is shared in the VLAN group. Furthermore, if the VLAN group is activated, a VLAN session is established among the VLAN devices, and a process is performed of sharing among the VLAN devices the virtual address information that has been created when activating the VLAN group. Furthermore, a process is performed of setting virtual address in the VLAN interface of the VLAN devices, the data is sent and received among the VLA devices via the VLAN interfaces and the VLAN sessions. As described above, in the relay communication system of this preferred embodiment, the client terminals can preferably communicate with each other as VLAN devices via the wide area network (WAN) 4, using the virtual address and the VLAN session.

Although specific preferred embodiments according to the present invention were explained above, the present invention is not limited to the above-described preferred embodiments. The preferred embodiments can be altered in various ways without departing from the scope of the present invention. Particularly, a plurality of preferred embodiments and variations can be arbitrarily combined with each other as necessary.

For example, a client terminal registered in the relay server information can log in remotely via other relay servers other than a relay server to which the client terminal is connected, if the relay server constitutes the same relay group. Accordingly, the VLAN client terminal can log in via different relay servers between when creating the VLAN group information and when activating the VLAN group. The state of the client terminal logging in via the other relay server is shared among the relay servers and the client terminals activated in the same relay group by sharing the same relay server information.

In the above-described case, the VLAN group information update unit 235 of the client terminal updates, receiving the selection of the VLAN group to be activated, the session information to session information including a relay server which has received the remote log-in. Then, the VLAN group information update unit 235 allows the VLAN client terminals and relay severs to which the VLAN client terminal is connected to share the updated VLAN group information.

For example, it is assumed that the first relay group includes the fourth relay server to which the VLAN client terminal is not connected, in addition to the first relay server A, the second relay server B, and the third relay server C. In this first relay group, if the first client terminal A1 remotely logs into the first relay group via the fourth relay server instead of the first relay server A, the shared session information does not include the identification information of the fourth relay server.

Therefore, when receiving the activation instruction of the VLAN group in the above-described state, the VLAN group information update unit 235 adds the identification information of the fourth relay server to the hub information of the session information. In addition, the VLAN group information update unit 235 creates routing information between the fourth relay server and another relay server to which the VLAN device is connected, and updates the session information of the VLAN group information. Then, the VLAN group information update unit 235 transmits the updated VLAN group information to the VLAN devices and the relay servers to which the VLAN devices are connected.

Preferred embodiments of the present invention can be applied to a relay server communication system including a plurality of relay servers that can communicate with each other, a plurality of client terminals, LANs connecting the client terminals to the relay servers, and to a relay server used in the relay server communication system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A relay communication system comprising:
a first network;
a second network;
a first relay server connected to the first network;
a second relay server connected to the second network, that communicates with the first relay server via a third network;
a first client terminal connected to the first relay server via the first network; and
a second client terminal connected to the second relay server via the second network; wherein
each of the first relay server, the second relay server, the first client terminal connected to the first relay server, and the second client terminal connected to the second relay server includes:
  a relay group information storage memory that stores relay group information that indicates the first relay server, the second relay server, and the first client terminal connected to the first relay server, and the second client terminal connected to the second relay server define a relay group;
  a relay server information storage memory that stores relay server information that includes activation information of the first relay server, activation information of the second relay server, activation/registration information of the first client terminal connected to the first relay server, and activation/registration information of the second client terminal connected to the second relay server;
  an information sharing controller that allows the first relay server, the second relay server, the first client terminal connected to the first relay server, and the second client terminal connected to the second relay server, to share the relay group information and the relay server information;
  a VLAN group information controller that allows VLAN client terminals defining a VLAN group in the relay group to share VLAN group information, at least two client terminals among the first client terminal connected to the first relay server and the second client terminal connected to the second relay server being the VLAN client terminals, and the VLAN group information including hub information including identification information of the first relay server and identification information of the second relay server to which the VLAN client terminal is connected, session information that indicates a connecting-side and a connected-side of a session established between the first relay server and the second relay server, and identification information that identifies the VLAN client terminal, each of the first relay server and the second relay server further includes:

an activation command controller that transmits a response signal including address information of a VLAN device as a VLAN client terminal that is arranged to be activated in a case of receiving an activation instruction of the VLAN group; and a VLAN session controller that establishes a hub session as a VLAN session between the first relay server and the second relay server based on the session information, and that establishes a device session as a VLAN session between the first relay server or the second relay server and the VLAN device connected to the first relay server or the second relay server;

each of the first client terminal connected to the first relay server and the second client terminal connected to the second relay server further includes a virtual address controller that creates virtual address information that includes virtual addresses given to the VLAN devices based on the response signal, and that transmits the virtual address information to the VLAN device;

if the first client terminal connected to the first relay server or the second client terminal connected to the second relay server is a VLAN device, the respective first or second client terminal sets the given virtual address in a VLAN interface of the respective first or second client terminal, and communicates with other VLAN device using the virtual address information and the VLAN session.

2. The relay communication system according to claim 1, wherein each of the first relay server and the second relay server further includes a relay server communication controller that controls communication between the VLAN devices, the relay server communication controller, in a case of receiving a communication packet, analyzes the received communication packet to confirm whether or not the communication packet includes the virtual address, if the analyzed communication packet includes the virtual address, the relay server communication controller refers to the virtual address and transmit the communication packet via the hub session to the first relay server or the second relay server, which is connected to the VLAN device to which the virtual address is given, or refers to the virtual address and transmit the communication packet via the device session to the VLAN device to which the virtual address is given.

3. The relay communication system according to claim 1, wherein each of the first relay server, the second relay server, the first client terminal connected to the first relay server, and the second client terminal connected to the second relay server further includes a VLAN group information update controller that updates the VLAN group information in accordance with change of connection state of the VLAN client terminal.

4. The relay communication system according to claim 3, further comprising a third relay server that communicates with the first relay server and the second relay server via a third network, and define the relay group, wherein each of the relay group information and the relay server information further includes information of the third relay server, in a case that the VLAN group information update controller receives an activation instruction of the VLAN group if the VLAN client terminal is connected to the third relay server, rather than the first relay server or the second relay server indicated in the hub information, the VLAN group information update controller updates the VLAN group information by adding identification information of the third relay server to the hub information of the VLAN group and by creating a session information including the third relay server.

5. The relay communication system according to claim 1, wherein the virtual address includes a virtual IP address and a virtual MAC address given to the VLAN device.

6. A relay server that serves as a second relay server connected to a second network, and communicates with a first relay server connected to a first network, the relay server comprising:

a relay group information storage memory that stores relay group information indicating that the first relay server, the second relay server, a first client terminal connected to the first relay server, and a second client terminal connected to the second relay server define a relay group;

a relay server information storage memory that stores relay server information including activation information of the first relay server, activation information of the second relay server, activation/registration information of the first client terminal connected to the first relay server, and activation/registration information of the second client terminal connected to the second relay server;

an information sharing controller that allows the first relay server, the second relay server, the first client terminal connected to the first relay server, and the second client terminal connected to the second relay server, to share the relay group information and the relay server information;

a VLAN group information controller that shares VLAN group information among VLAN client terminals defining a VLAN group in the relay group, at least two client terminals among the first client terminals connected to the first relay server and the second client terminal connected to the second relay server being the VLAN client terminals, and the VLAN group information including hub information including identification information of the first relay server and the second relay server to which the VLAN client terminal is connected, session information that indicates a connecting-side and a connected-side in a session established between the first relay server and the second relay server, and identification information that identifies the VLAN client terminal;

an activation command controller that transmits a response signal including address information of a VLAN device that is arranged to be activated as a VLAN client terminal in a case of receiving an activation instruction of the VLAN group;

a virtual address controller that transmits the virtual address information to the VLAN device, when receiving virtual address information that includes virtual addresses given to the VLAN devices and is created based on the response signal;

a VLAN session controller that establishes a hub session as a VLAN session with the first relay server based on the session information, and that establishes a device session as a VLAN session with the VLAN device connected to the second relay server; and a relay server communication controller that controls communication among the VLAN devices using the virtual address information and the VLAN session.

7. The relay server according to claim 6, wherein in a case of receiving a communication packet, the relay server communication controller analyzes the received communication packet to confirm whether or not the communication packet includes a virtual address, and if the communication packet includes the virtual address, the relay server communication controller refers to the virtual address and transmit the communication packet via the hub session to the first relay server connected to the VLAN device to which the virtual address is given, or refers to the virtual address and transmit the communication packet via the device session to the VLAN device to which the virtual address is given.

8. The relay server according to claim 6, further comprising a VLAN group information update controller that updates the VLAN group information in accordance with a change of the connection state of the VLAN client terminal.

9. The relay server according to claim 6, wherein in a case of the VLAN group information update controller receiving an activation instruction of the VLAN group, if the VLAN client terminal is connected to a third relay sever defining the relay group, rather than the first relay server or the second relay server indicated by the hub information, the VLAN group information update controller updates the VLAN group information by adding identification information of the third relay sever to the hub information of the VLAN group and by creating a session information including the third relay server.

10. The relay server according to claim 6, wherein the virtual address includes a virtual IP address and a virtual MAC address given to the VLAN device.

* * * * *